(12) United States Patent
Nomura

(10) Patent No.: US 11,212,446 B2
(45) Date of Patent: Dec. 28, 2021

(54) TRACKING DEVICE AND TRACKING METHOD

(71) Applicant: OLYMPUS CORPORATION, Hachioji (JP)

(72) Inventor: Hirotoshi Nomura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/816,906

(22) Filed: Mar. 12, 2020

(65) Prior Publication Data

US 2020/0329199 A1 Oct. 15, 2020

(30) Foreign Application Priority Data

Apr. 10, 2019 (JP) .............................. JP2019-075186

(51) Int. Cl.
*H04N 5/232* (2006.01)
*H04N 5/235* (2006.01)

(52) U.S. Cl.
CPC ..... *H04N 5/23287* (2013.01); *H04N 5/23254* (2013.01); *H04N 5/23258* (2013.01); *H04N 5/23299* (2018.08)

(58) Field of Classification Search
CPC ....................... H04N 5/23287; H04N 5/23254
See application file for complete search history.

(56) References Cited

U.S. PATENT DOCUMENTS

| 2005/0140793 | A1* | 6/2005 | Kojima | .............. H04N 5/23287 348/208.99 |
| 2009/0245774 | A1* | 10/2009 | Uenaka | .............. H04N 5/23258 396/55 |
| 2010/0103251 | A1 | 4/2010 | Numako | |
| 2014/0125816 | A1* | 5/2014 | Ohta | ..................... G02B 27/648 348/169 |
| 2015/0097977 | A1* | 4/2015 | Watanabe | .......... H04N 5/23258 348/208.2 |
| 2016/0248978 | A1 | 8/2016 | Nishihara | |
| 2016/0323526 | A1* | 11/2016 | Washisu | ............. H04N 5/23238 |
| 2017/0085799 | A1 | 3/2017 | Yoshida | |

FOREIGN PATENT DOCUMENTS

JP 2015-215427 A 12/2015

* cited by examiner

*Primary Examiner* — Christopher K Peterson
(74) *Attorney, Agent, or Firm* — Volpe Koenig

(57) ABSTRACT

A tracking device, comprising a first image stabilization actuator that moves the image stabilization lens, a second image stabilization actuator that moves an image sensor, and a processor that has a calculation section, a determination section and a tracking control section, wherein the determination section determines whether or not a subject image exists at a specified position within an effective imaging region of the image sensor, the calculation section calculates movement direction and movement velocity for moving the subject image with respect to the image sensor, and the tracking control section performs drive control for at least one of the first image stabilization actuator and the second image stabilization actuator based on the movement direction and movement velocity that have been calculated by the calculation section, to perform tracking such that the subject image is always positioned at a specified position within the effective imaging region of the image sensor.

16 Claims, 16 Drawing Sheets

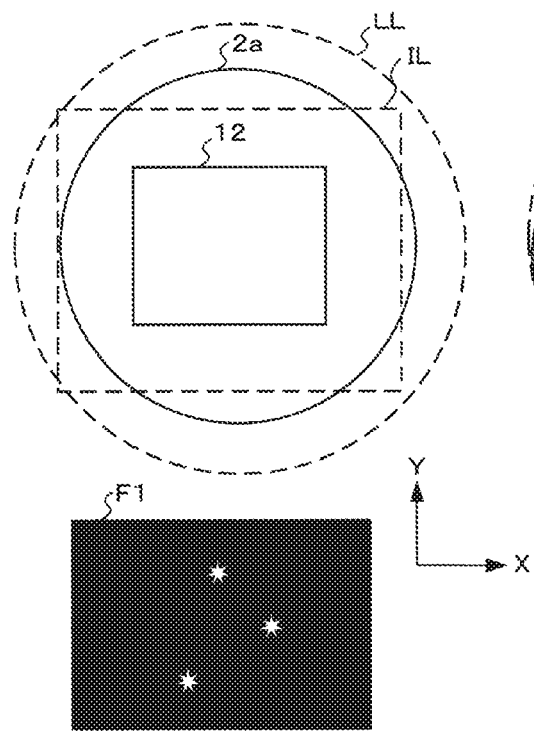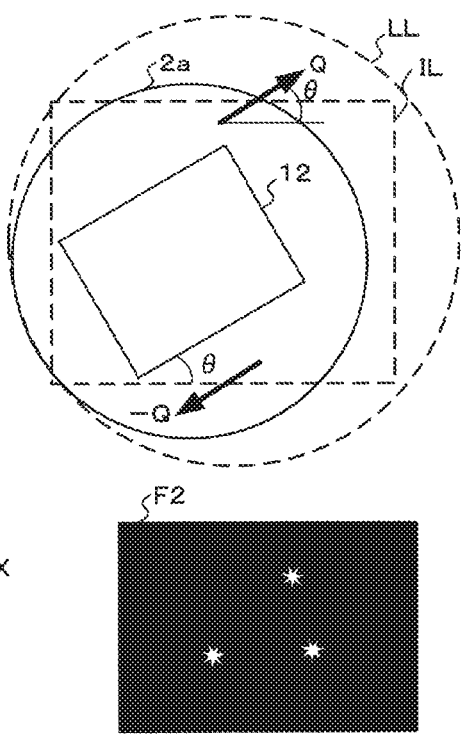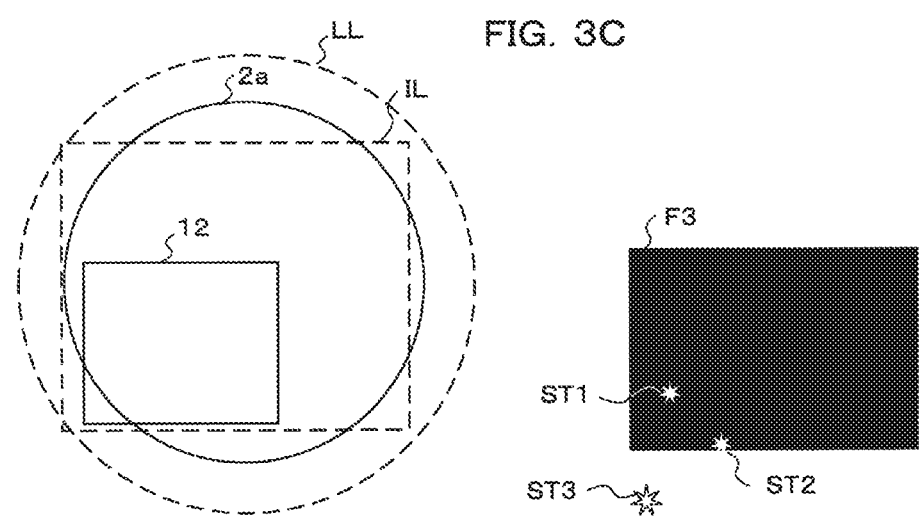

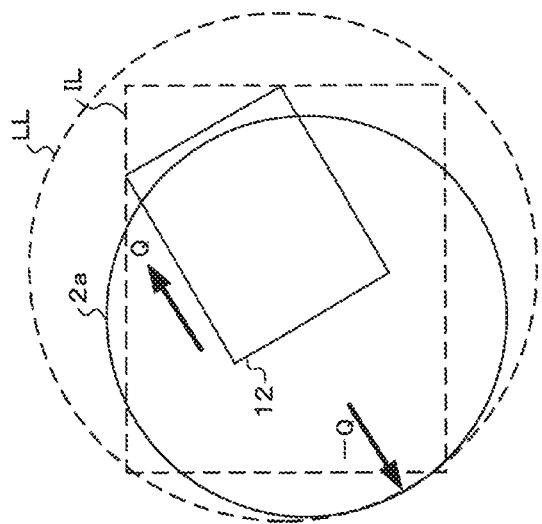
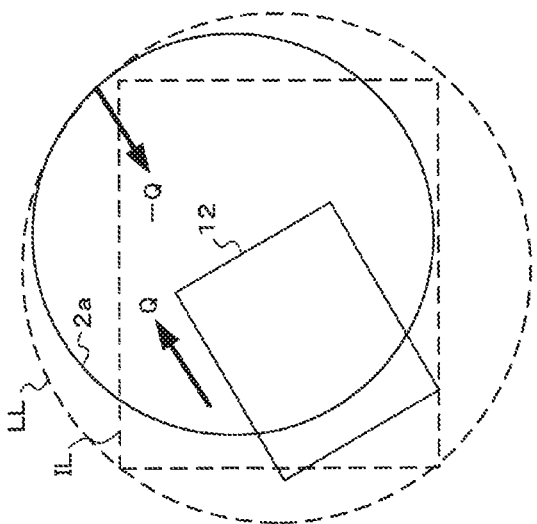

FIG. 9A  BODY SIDE
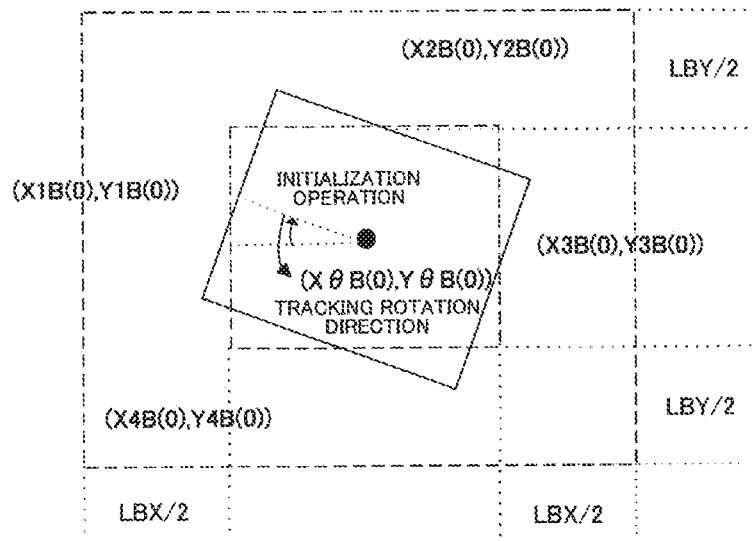
FIG. 9B  LENS BARREL SIDE
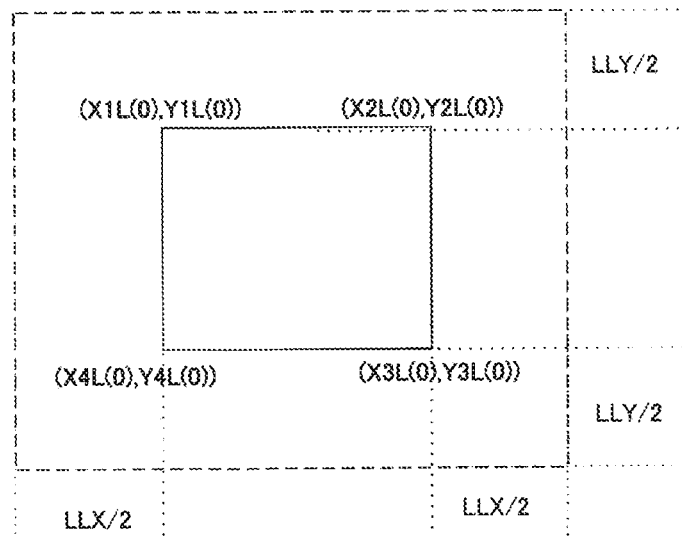

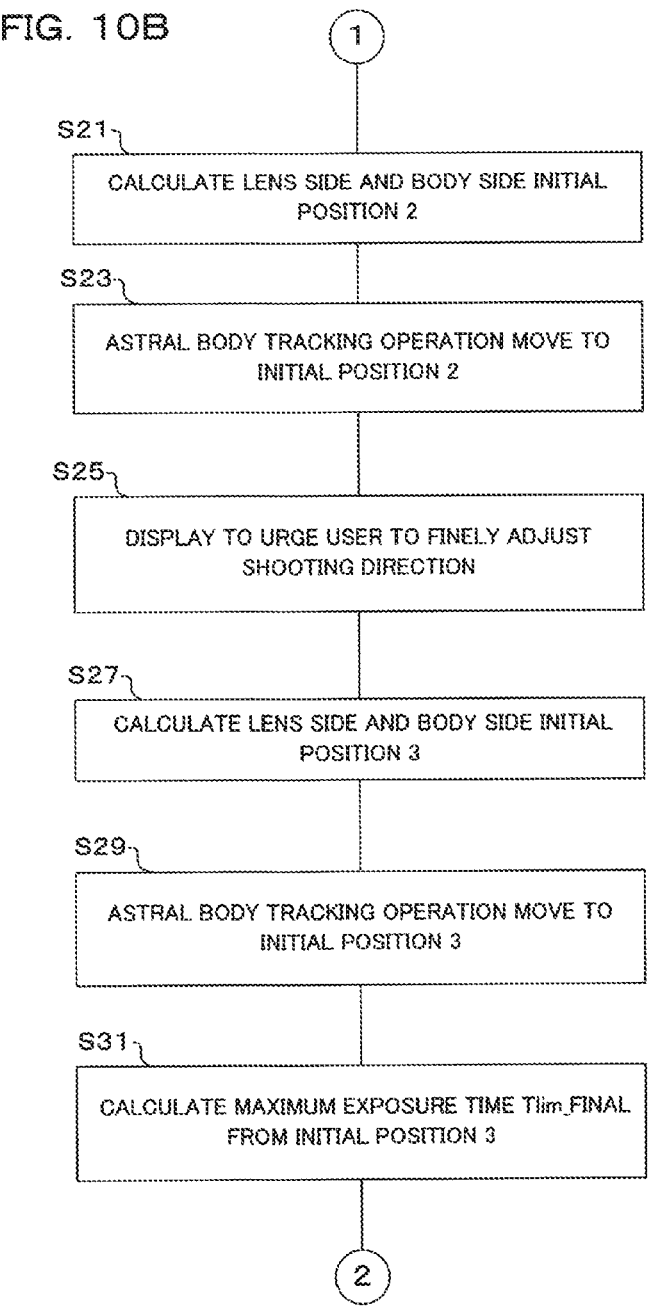

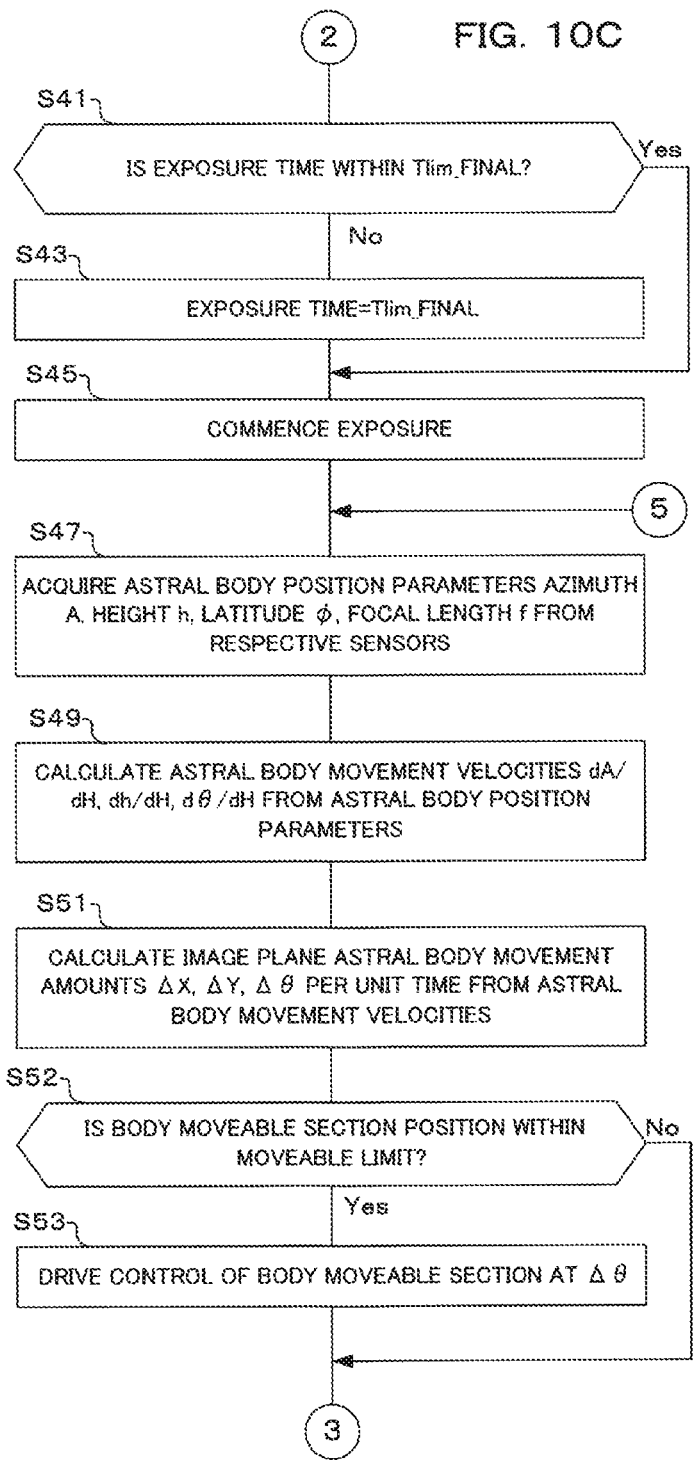

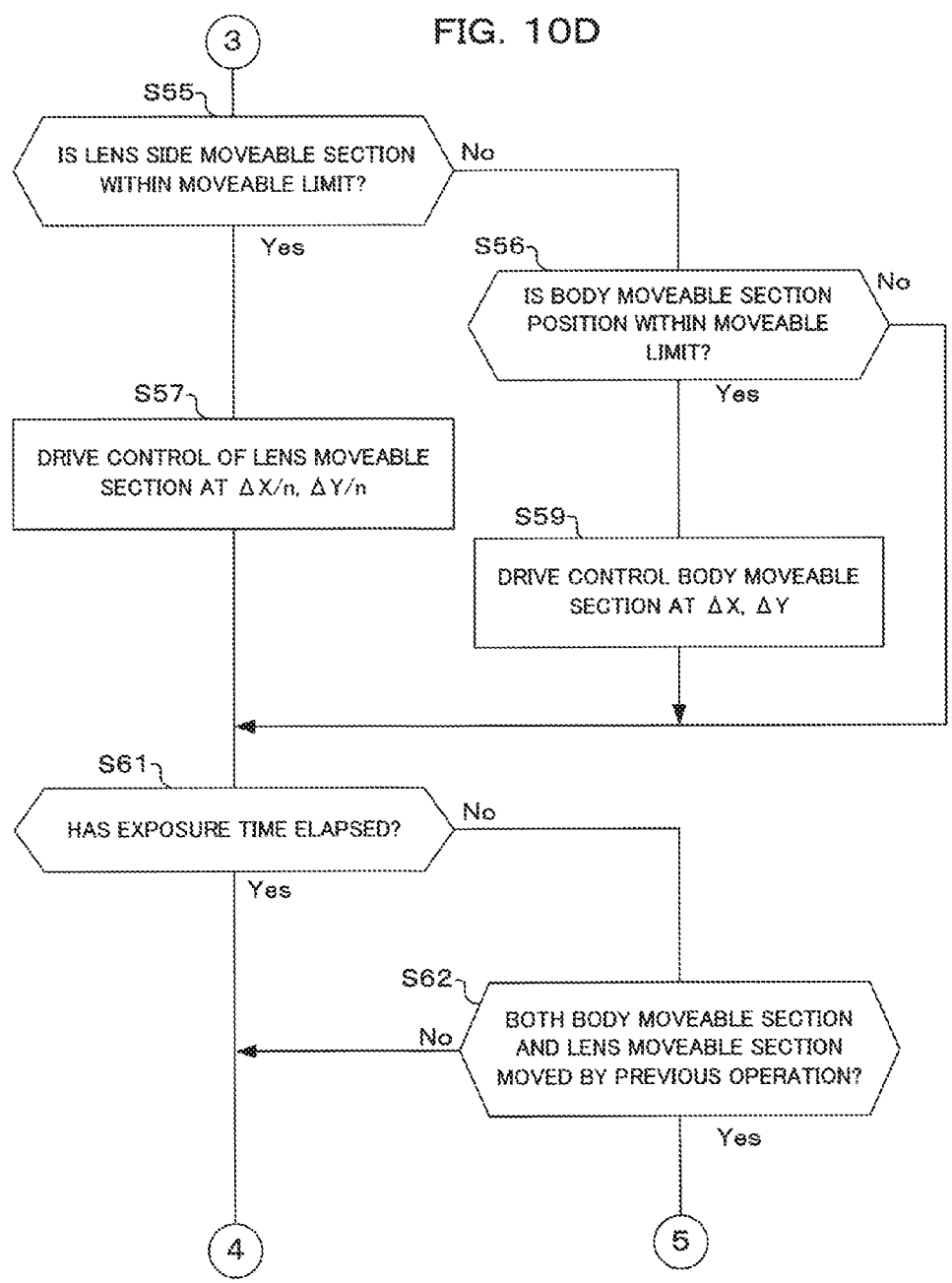

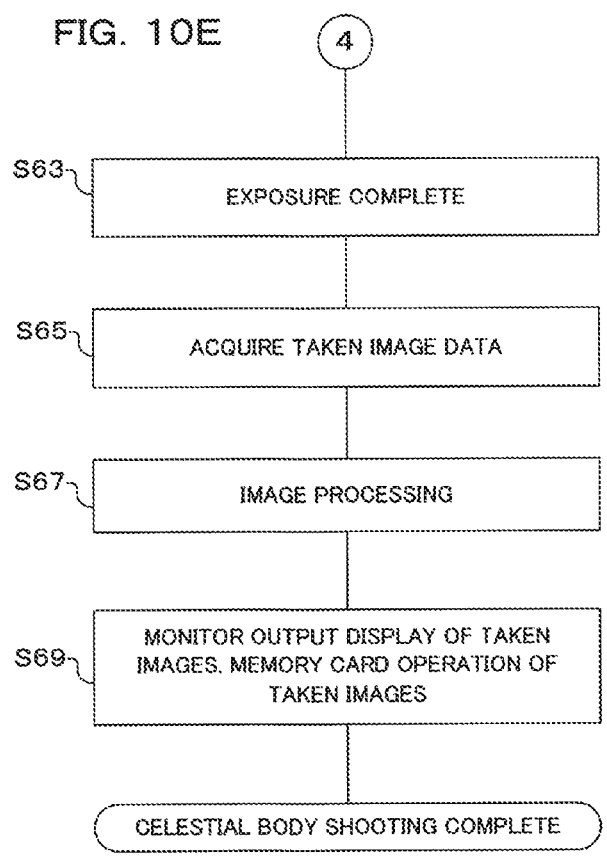

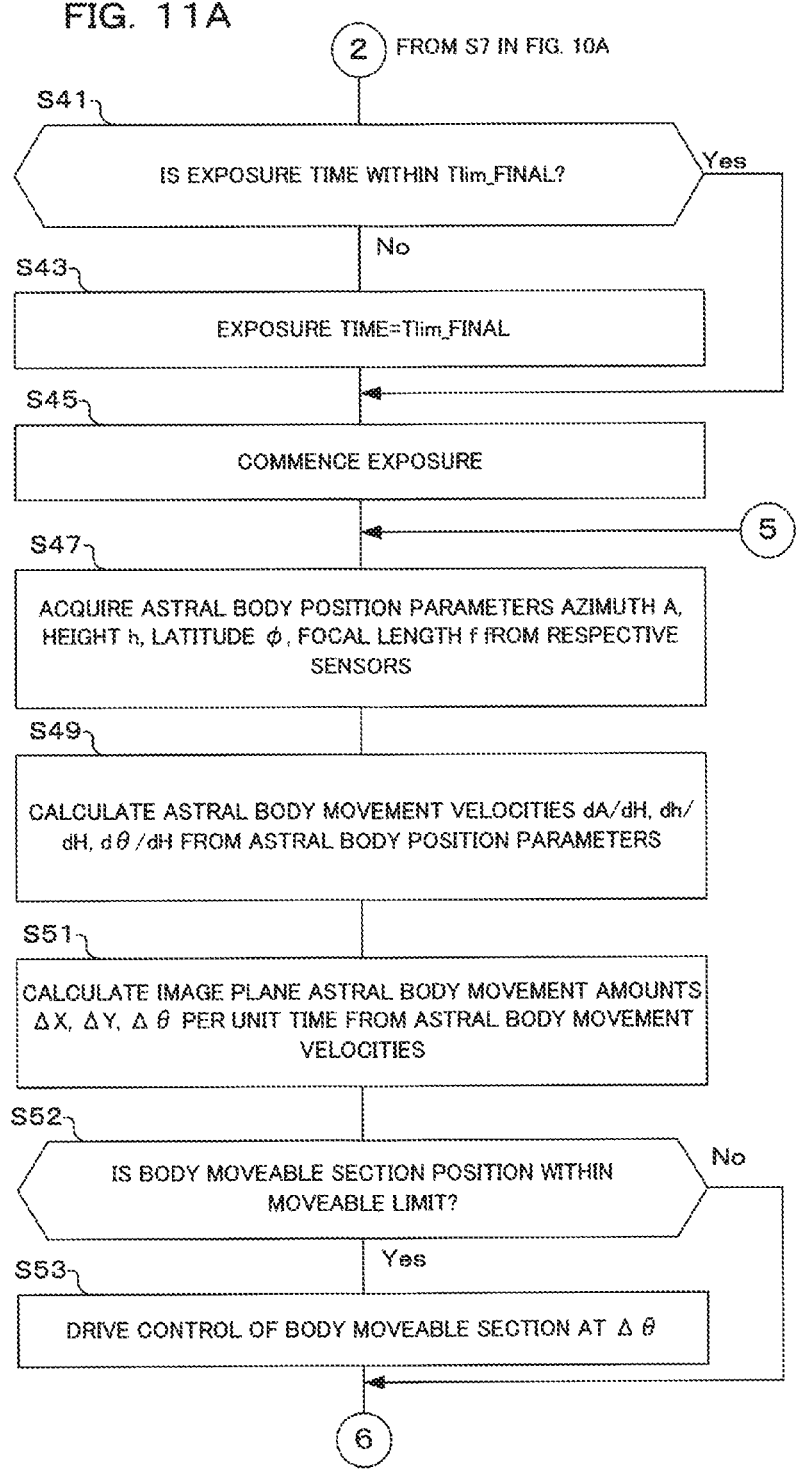

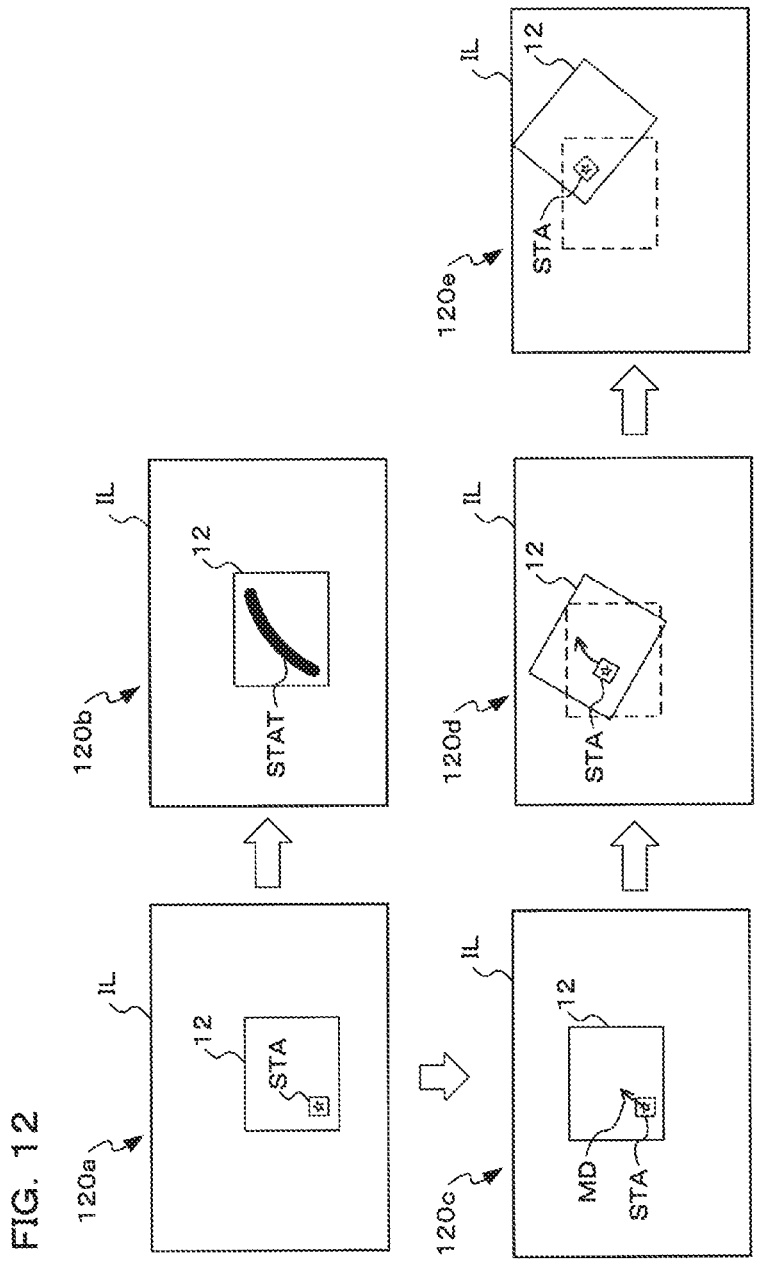

TRACKING DEVICE AND TRACKING METHOD

CROSS-REFERENCE TO RELATED APPLICATIONS

Benefit is claimed, under 35 U.S.C. § 119, to the filing date of prior Japanese Patent Application No. 2019-075186 filed on Apr. 10, 2019. This application is expressly incorporated herein by reference. The scope of the present invention is not limited to any requirements of the specific embodiments described in the application.

BACKGROUND OF THE INVENTION

1. Field of the Invention

The present invention relates to a tracking device and a tracking method, in an imaging apparatus having a photographing optical system and an image sensor, that can track an astral body etc.

2. Description of the Related Art

Because heavenly bodies rotate around the celestial north pole, if a photograph is taken over a long time, it will result in a photograph having light trails. A digital camera as therefore been proposed that can take pictures by following astral bodies and keeping the image of the astral bodies stationary, using an image stabilization mechanism provided within an imaging apparatus (refer to Japanese patent laid-open No. 2010-122672 (hereafter referred to as "patent publication 1")). This image stabilization mechanism for a digital camera can cause an image sensor and an optical system within a photographing lens to move, and moves the image sensor and the optical system so as to eliminate movement of an astral body image, thus keeping the astral body image stationary.

With the digital camera disclosed in patent publication 1, when tracking astral bodies etc. an image stabilization mechanism at the camera body side is used only in order to make an astral body image stationary by eliminating rotational movement, while an image stabilization mechanism at the photographing lens side is used in order to make the image stationary by counteracting movement of the astral body image in the horizontal direction and vertical direction. It is described that both the camera body side image stabilization mechanism and the photographing lens side image stabilization mechanism may be used, but there is no specific description regarding how the two image stabilization mechanisms would be controlled. There is therefore no description regarding control of a moving part for causing movement of the image sensor to a longest drive possible position that has been calculated.

With the digital camera described in patent publication 1, an initial position when driving for the longest duration is an optical axis position, and only the vibration mechanism at the photographing lens side is driven, which means that it is not possible to make exposure time (observation time) long. As a result, in order to lengthen exposure time it was necessary to move a camera itself for resetting position with respect to a subject, and to maintain the consistency with the setting before the position was reset.

SUMMARY OF THE INVENTION

The present invention provides a tracking device and tracking method that are capable of tracking a subject such as astral bodies, over a long exposure time (observation time).

A tracking device of a first aspect of the present invention comprises a photographing optical system having an image stabilization lens, a first image stabilization actuator that corrects camera shake by moving the image stabilization lens, a second image stabilization actuator that corrects camera shake by moving an image sensor, and a processor that has a calculation section, a determination section and a tracking control section, wherein the determination section determines whether or not a subject image exists at a specified position within an effective imaging region of the image sensor, the calculation section calculates movement direction and movement velocity for moving the subject image with respect to the image sensor, and the tracking control section performs drive control for at least one of the first image stabilization actuator and the second image stabilization actuator based on the movement direction and movement velocity that have been calculated by the calculation section, to perform tracking such that the subject image is always positioned at a specified position within the effective imaging region of the image sensor.

A tracking method of a second aspect of the present invention is a tracking method for a tracking device comprising a photographing optical system having an image stabilization lens, a first image stabilization actuator that corrects camera shake by moving the image stabilization lens, and a second image stabilization actuator that corrects camera shake by moving an image sensor, and comprises determining whether or not a subject image exists at a specified position within an effective imaging region of the image sensor, calculating movement direction and movement velocity for moving the subject image with respect to the image sensor, and performing drive control for at least one of the first image stabilization actuator and the second image stabilization actuator based on the movement direction and movement velocity that have been calculated by the calculation section, to track the subject image so that the subject image is always positioned at a specified position, within the effective imaging region of the image sensor.

A tracking device of a third aspect of the present invention comprises a photographing optical system having an image stabilization lens, a first image stabilization actuator that corrects camera shake by moving the image stabilization lens, a second image stabilization actuator that corrects camera shake by moving an image sensor, and a processor having a calculation section and a tracking control section, wherein the calculation section, in a state where the first and second image stabilization actuators are held at initial positions, calculates movement direction and movement velocity of a subject image that exists within an effective imaging region of the image sensor, and the tracking control section repeatedly performs a tracking operation to move the image stabilization lens and the image sensor in an opposite direction to a tracking direction on an image plane, make a position, resulting from the movement of the image stabilization lens and the image sensor in the direction opposite to the tracking direction, a second initial position, recalculate movement direction and movement velocity from the second initial position, move one of the first image stabilization actuator or the second image stabilization actuator at a first movement velocity in order for the subject image to be shifted in the first direction within the effective imaging region, and move the first image stabilization actuator or the second image stabilization actuator at a second movement velocity, if it has been determined that further shift is possible, in order for the subject image to be shifted in a second direction within the effective imaging region, until an exposure time is reached.

BRIEF DESCRIPTION OF THE DRAWINGS

FIG. 3A to FIG. 3C are drawings showing a second example (second tracking mode) of movement range of an image sensor and an optical system, in the camera of one embodiment of the present invention.

FIG. 4A and FIG. 4B are drawings showing a third example (third tracking mode) of movement range of an image sensor and an optical system, in the camera of one embodiment of the present invention.

FIG. 9A and FIG. 9B are drawings for describing θ direction movable amount limits for the above described second example, in the camera of one embodiment of the present invention.

FIG. 10A to FIG. 10E are flowcharts showing operation for celestial body shooting with the camera of one embodiment of the present invention.

FIG. 11A and FIG. 11B are flowcharts showing a modified example of celestial body shooting operation of the camera of one embodiment of the present invention.

FIG. 12 is a drawing for describing tracking of astral bodies, with the camera of one embodiment of the present invention.

DETAILED DESCRIPTION OF THE PREFERRED EMBODIMENTS

An example where the present invention is adopted in a digital camera (hereafter referred to as a "camera"), as a tracking device of one embodiment of the present invention, will be described in the following. This camera has an imaging section, with this imaging section converting a subject image to image data, and the subject image being subjected to live view display on a display section arranged on the rear surface of the camera body based on this image data that has been converted. A photographer determines composition and photo opportunity by looking at the live view display. At the time of a release operation image data is stored in a storage medium. Image data that has been stored in the storage medium can be subjected to playback display on the display section if playback mode is selected.

This camera also has a lens-side image stabilization mechanism (lens-side image stabilization unit) that moves part (image stabilization lens 2a) of the optical system that has been arranged inside the lens barrel 1 on a plane that is orthogonal to the optical axis. The camera also has a camera body (body) side vibration mechanism in which an image sensor 12 arranged in the camera body (body) 10 is capable of moving in the X axis direction and Y axis direction on a plane that is orthogonal to the optical axis of the optical system, and is further capable of rotating about the optical axis within a plane orthogonal to the optical axis. When shooting (exposure) or observing an astral body image, the camera is input with position information of the camera (latitude φ etc.), shooting azimuth information (azimuth A), shooting height information (height h), and focal length information of the optical system (focal length f). Using these items of information that have been input, the camera moves the lens-side image stabilization mechanism and the camera-side image stabilization mechanism, tracks the astral body image, and take a picture in a state where the astral body image is stationary.

Figure 1:
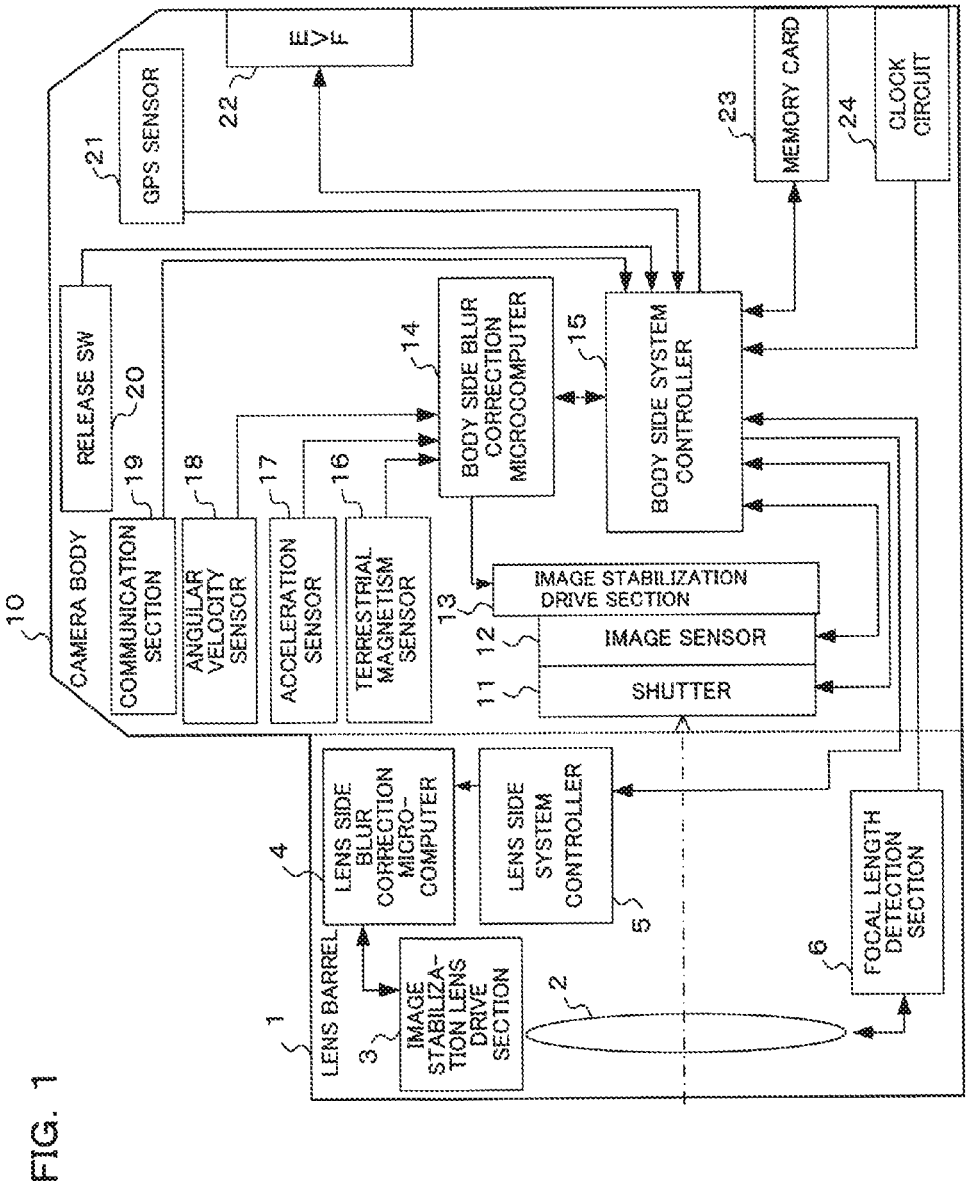
FIG. 1 is a block diagram mainly showing the electrical structure of a camera of one embodiment of the present invention.

FIG. 1 is a block diagram mainly showing the electrical structure of the camera of this embodiment. This camera is an interchangeable lens type camera having a lens barrel 1 and a body (camera body) 10. The lens barrel 1 is constructed to as to be attachable to the body 10. It should be noted that the camera of this embodiment is not limited to being an interchangeable lens type camera, and may also have the lens barrel and the body formed integratedly.

A photographing lens 2, image stabilization lens drive section 3, lens-side blur correction microcomputer 4, lens-side system controller 5, and focal length detection section 6 are provided within the lens barrel 1.

The photographing lens 2 has a focus lens, zoom lens, fixed lens, and image stabilization lens 2a (refer to FIG. 2A to FIG. 2C), and forms a subject image on the image sensor 12. The focus lens is moved in the optical axis direction by a lens drive section, that is not shown, and performs focus adjustment. The zoom lens is moved in the optical axis direction manually or by a lens drive section, that is not shown, and changes focal length. The image stabilization lens 2a is moved in the X axis direction and Y axis direction within a plane that is orthogonal to the optical axis direction by the image stabilization lens drive section 3, and can perform an image stabilization operation and a tracking operation of the astral body image. It should be noted that the X axis direction is a longitudinal direction of the body in a plane that is orthogonal to the optical axis, and the Y axis direction is a direction that is orthogonal to the X axis direction within the plane that is orthogonal to the optical axis (refer to FIG. 2A to FIG. 2C). The photographing lens 2 functions as a photographing optical system that has an image stabilization lens.

The image stabilization lens drive section 3 has an actuator, such as a lens drive circuit and a motor, and drives the image stabilization lens 2a. In particular the image stabilization lens drive section 3 drives the image stabilization lens 2a in the X axis direction and the Y axis direction, within the plane that is orthogonal to the optical axis of the photographing lens 2, based on control signals from the lens-side blur correction microcomputer 4. Also, the image stabilization lens drive section 3 has a position sensor that detects position of the image stabilization lens 2a in the X axis direction and the Y axis direction. For example, this position sensor may be constructed using a magnet and hall elements, as shown in FIG. 3 in the publication US2017/0085799. In this case, the magnet is disposed at a fixed section side within the image stabilization lens drive section 3 and the hall elements are disposed at the movable section side, and the lens-side blur correction microcomputer 4 recognizes current position of the image stabilization lens 2a based on magnitude of a voltage output by the hall elements. This patent application publication is expressly incorporated herein by reference.

The lens-side blur correction microcomputer 4 is a processor having a CPU (Central Processing Unit), a memory that stores programs etc., and peripheral circuits. In a case where position detection is performed using the above described magnet and hall elements, the lens-side blur correction microcomputer 4 subjects a voltage signal that has been obtained from the hall elements to AD conversion using an AD conversion circuit, in order to be able to perform processing within the lens-side blur correction microcomputer 4, and recognizes current position as a digital signal. The lens-side blur correction microcomputer 4 performs drive control based on a control signal from the lens-side system controller 5 so that current position of a movable section of the image stabilization lens 2a for camera shake correction becomes a target position. This target position is a position that is obtained by calculating blur amount on the image plane based on output of an acceleration sensor, gyro sensor etc. and calculating by how much to move the image stabilization lens 2a in order to negate this blur amount. This target position that has been calculated is output to the image stabilization lens drive section 3.

Also, in a case where tracking mode is set, the lens-side blur correction microcomputer 4 also performs drive control so that the current position of the movable section of the image stabilization lens 2a becomes the target position, so that it is possible to perform shooting with the astral body image kept stationary. This target position is a sum of a value (integrated value) resulting from having calculated by how much to move the image stabilization lens 2a in order to negate movement of the astral bodies on the image plane and a reference position (initial position), and is position information that is output to the image stabilization lens drive section 3. Movement amount of the astral bodies is obtained by calculating astral body movement amount on the image plane per unit time, based on output of respective sensors. The image stabilization lens drive section 3 functions as a first image stabilization actuator (first image stabilization section) that corrects camera shake by moving the image stabilization lens. Also, a position detection sensor of the image stabilization lens drive section 3 functions as a first position detection sensor (first position detection section) that detects position of the image stabilization lens that has been moved by the first image stabilization actuator (first image stabilization section).

The lens-side system controller 5 lens-side blur correction microcomputer 4 is a processor having a CPU (Central Processing Unit), a memory that stores programs etc., and peripheral circuits. The lens-side system controller 5 also has a communication circuit for performing communication with a body-side system controller 15. The lens-side system controller 5 performs overall control within the lens barrel 1, such as aperture control within the lens barrel 1, focus adjustment of the focus lens, and control of the image stabilization lens 2a etc. based on control signals from the body-side system controller 15

Figure 10A:
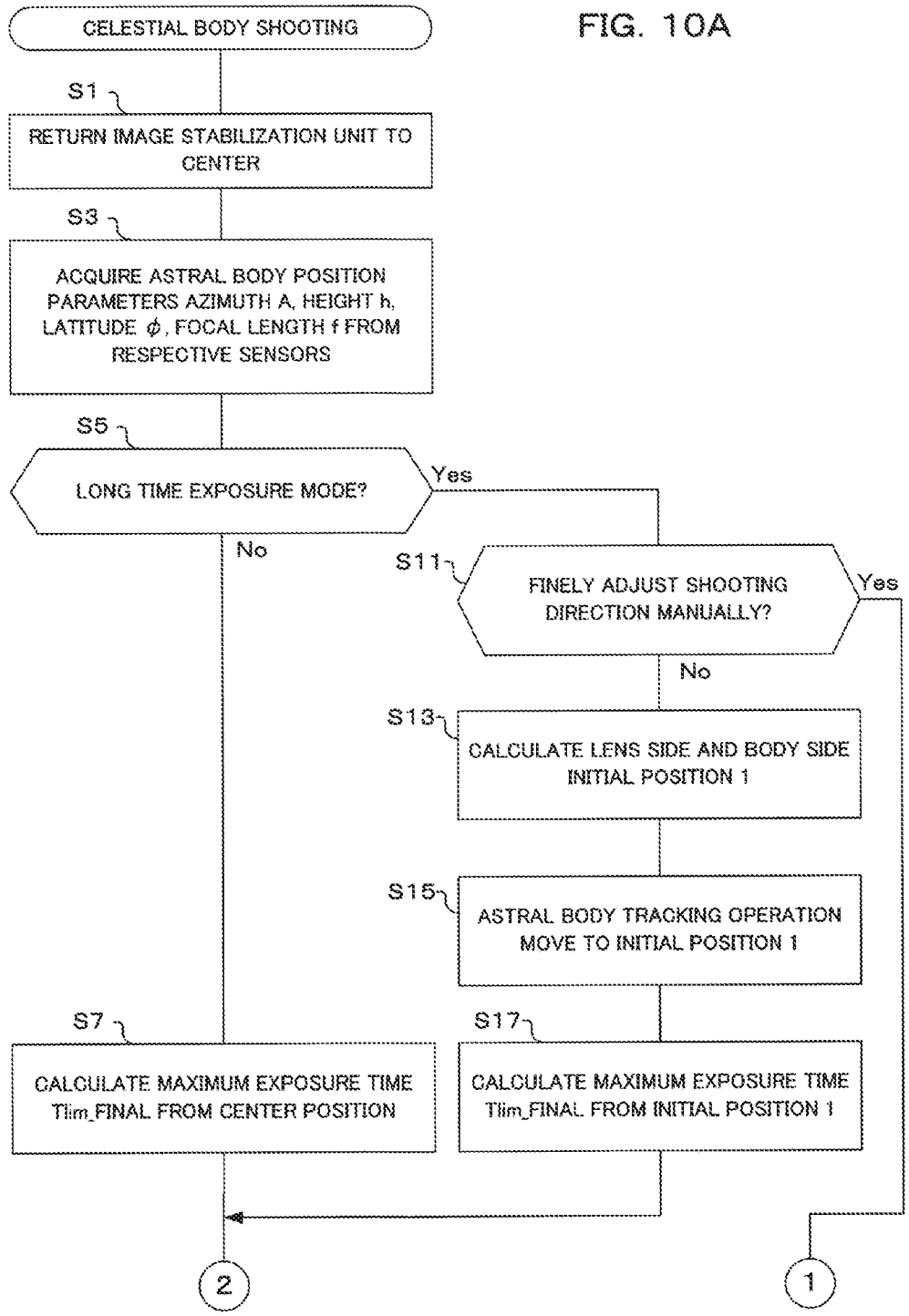

The focal length detection section 6 has sensors such as a zoom encoder, and detects focal length information f of the photographing lens 2 based on position of the zoom lens within the photographing lens 2 (refer to S3 in FIG. 10A). The focal length information f that has been detected is transmitted to the body-side system controller 15. It should be noted that the focal length detection section 6 may transmit the focal length information f directly to the body-side system controller 15, but may also transmit the focal length information f to the body-side system controller 15 by means of the communication circuit within the lens-side system controller 5.

A shutter 11 is arranged within the body 10, on the optical axis of the photographing lens 2. The shutter 11 is a mechanical shutter such as a focal plane shutter, and controls exposure time of subject light flux on the image sensor 12.

The image sensor 12 is arranged close to a position where a subject image is formed by the photographing lens 2. The image sensor 12 is, for example, a CCD (Charge Coupled Device) or CMOS (Complementary Metal-Oxide-Semiconductor) image sensor etc. The image sensor 12 has pixels arranged two-dimensionally, and subjects a subject image that has been formed by the photographing lens 2 to photoelectric conversion using photodiodes to form a photoelectric conversion signal. An image signal is output based on this photoelectric conversion signal, and subjected to image processing for live view display and for image storage. It should be noted that a contrast value (focus evaluation value) is also calculated using the image signal, and focus adjustment of the focus lens may be performed using this contrast value. Also, phase difference pixels are arranged on the image sensor 12, and focus adjustment of the focus lens may be performed using a defocus amount based on these phase difference pixels.

An image stabilization drive section 13 has actuators such as drive circuits, and moves the image sensor 12 in the X axis direction and the Y axis direction within a plane that is orthogonal to the optical axis, and rotationally drives the image sensor 12 about the optical axis. Specifically, the image stabilization drive section 13 performs various drives on the image sensor 12 based on control signals from the body-side blur correction microcomputer 14. For example, the image stabilization drive section 13 drives the image sensor 12 so as to eliminate camera shake, or so as to track an astral body image, or so as to perform both of these tasks at the same time. Also, the image stabilization drive section 13 moves the center of the image sensor 12 to a position that is aligned with the optical axis of the photographing lens 2 (also called a centering operation), or moves the center of the image sensor 12 to a specified initial position in order to track an astral body image and shoot in a stationary state.

The image stabilization drive section 13 also has a position sensor for detection position of the image sensor 12 in the X axis direction, Y axis direction, and rotation direction. The position sensor that detects position of the image stabilization drive section 13 (image sensor 12) can also be realized by the addition of another direction sensor, in addition to the X direction and the Y direction. For example, this position sensor may be constructed using a magnet and hall elements, as shown in FIG. 3 and FIG. 4 in the publication US2016/0248978. In this case, the magnet is disposed at a fixed section side of the image stabilization drive section 13 and the hall elements are disposed at the movable section side, and the body-side blur correction microcomputer 14 recognizes current position of the image stabilization drive section 13 (image sensor 12) based on magnitude of a voltage output by the hall elements. This patent application publication is expressly incorporated herein by reference.

It should be noted that, similarly to the lens-side blur correction microcomputer 4, the body-side blur correction microcomputer 14 subjects a voltage signal that has been acquired from the hall element to AD conversion using an AD conversion circuit within the body-side blur correction microcomputer 14, and recognizes current position as a digital signal. As a result of this, the voltage signal that has been acquired using the hall element can be processed within the body-side blur correction microcomputer 14, and it is possible to recognize current position of the body-side movable section as a digital signal. Also, in a case where a pulse motor is used as a drive source for the image sensor 12, the body-side blur correction microcomputer 14 may perform position detection using a number of pulses that are applied to the pulse motor, without the hall element etc. being provided. In this case, detection by means of counting a number of applied pulses is equivalent to the function of a position sensor.

The image stabilization drive section 13 functions as a second image stabilization actuator (second image stabilization section) that corrects camera shake by moving the image sensor unit. The position detection sensor within the image stabilization drive section 13 functions as a second position detection sensor (second position detection section) that detects position of the image sensor units that has been moved by the second image stabilization actuator (second image stabilization section).

A terrestrial magnetism sensor 16 measures magnetic direction, and obtained a shooting azimuth A (refer to S3 in FIG. 10A). Measurement results are output to the body-side blur correction microcomputer 14. An acceleration sensor 17 detects change in speed per unit time, that is, detects acceleration, and outputs detection results to the body-side blur correction microcomputer 14. An angular velocity sensor 18 detects rotation angle per unit time that has been applied to the body 10, that is, detects angular velocity, and outputs detection results to the body-side blur correction microcomputer 14 (refer to height h in S3 of FIG. 10A).

The body-side blur correction microcomputer 14 is a processor comprising a CPU, a memory that stores programs, and peripheral circuits. The body-side blur correction microcomputer 14 is input with detection results from the acceleration sensor 17 and the angular velocity sensor 18, detects camera shake amount that has been applied to the body 10, and performs drive control of the image sensor 12 using the image stabilization drive section 13 based on the result of this detected camera shake about so as to eliminate camera shake. Also, the body-side blur correction microcomputer 14 calculates shooting azimuth A based on detection results from the terrestrial magnetism sensor 16, calculates current location based on detection results from A GPS sensor 21, which will be described later, and calculates shooting height h based on detection results from the acceleration sensor 17 and angular velocity sensor 18 (refer to S3 in FIG. 10A). The body-side blur correction microcomputer 14 performs drive control of the movable section of the image stabilization drive section 13 based on the previously described calculation results and current time etc. output by the clock circuit 24, in accordance with control signals from the body-side system controller 15, so that current position of the image sensor 12 becomes a target position. As a result of this drive control the astral body image that is formed on the image sensor 12 of the camera becomes stationary. Also, drive control of the image stabilization lens 2a of the photographing lens 2 is performed by the body-side system controller 15, lens-side system controller 5, and lens side camera blur correction section 5.

The body-side system controller 15 is a processor having a CPU (Central Processing Unit), a memory that stores programs etc., and peripheral circuits. The lens-side system controller 5 also has a communication circuit for performing communication with a body-side system controller 15. The body-side system controller 15 performs overall control of the camera that is comprised of the body 11 and the lens barrel 1 by controlling each section within the body 11 in accordance with a program, and performing control of each section within the lens-side system controller 5 using the lens-side system controller 5. As part of the overall control, the body-side system controller 15 tracks a subject such as of astral bodies by translational drive and rotational drive of the image stabilization lens 2a and the image sensor 12 within a plane that is orthogonal to the optical axis of the photographing lens 2.

The body-side system controller 15 functions as a calculation section that calculates movement direction and movement velocity for moving the subject image with respect to the image sensor unit (refer to S13 in FIG. 10A, S23 and S29 in FIG. 10B, and S47, S49 and S51 in FIG. 10C, etc.). The body-side system controller 15 functions as a determination section that determines whether or not the subject image exists at a specified position within the effective imaging region of the image sensor unit (refer to S52 in FIG. 10C, and S55 and S56 in FIG. 10D, etc.). It should be noted that the effective imaging region here is an area that is on the image sensor 12, and is a region where it is possible to consider that an image that has been formed is not moving, as a result of having rotated and translated the image stabilization sections. Determination as to whether or not the subject image is within the effective imaging region is determination as to whether or not the subject is within a region in which it can be expected that a difference (deviation), between target position of a first or second image stabilization section that has been calculated from movement of an astral body group that has been detected, and current position that has been calculated by a position sensor of the first or second image stabilization section, will be sufficiently small. Even if movable sections of the first or second image stabilization sections are in contact with mechanical ends, it is possible to handle as if they are within the effective imaging region as long as the deviation is within a range of permissible values in terms of image quality.

The body-side system controller 15 functions as a tracking control section that that performs tracking by performing drive control of at least one of the first image stabilization actuator and the second image stabilization actuator (first image stabilization section and second image stabilization section) based on movement direction and movement velocity that have been calculated by the calculation section, so that a subject image is always positioned at a specified position within an effective imaging region of the image sensor unit (refer, for example, to S53 in FIG. 10C, and S57 and S59 in FIG. 10D). Also, the body-side system controller 15 functions as a tracking control section that is capable of performing a tracking operation whereby one of the first image stabilization actuator and the second image stabilization actuator (first image stabilization section and second image stabilization section) is driven at a first movement velocity to shift current position of the movable section in a first direction to a target position, with the subject image within an effective imaging region (refer to S21 and S23 in FIG. 10B), and, when it has been determined by the determination section that further shift is possible, drives the other of the first image stabilization actuator and the second image stabilization actuator (first image stabilization section and second image stabilization section) at a second movement velocity to shift current position of the movable section in a second direction to a target position, with the subject image within the effective imaging region (refer to S55, S57 and S59 in FIG. 10D).

The above described tracking control section initially performs drive control of the first image stabilization actuator (first image stabilization section) based on output from either one of a first position detection sensor and a second position detection sensor (first position detection section and second position detection section) until an image stabilization section corresponding to the one of the position detection sections is shifted up to a first target position that is a shift available limit (refer, for example, to S57 in FIG. 10D), and then controls the other of the image stabilization actuators (image stabilization sections) based on output from the other position detection sensor (position detection section) of the other of the first position detection sensor and second position detection sensor (first and second position detection sections) until the other image stabilization actuator (image stabilization section) is shifted up to a second target position that is a shift available limit (refer, for example, to S59 in FIG. 10D).

The tracking control section, in a case when it has been determined by the determination section that position of the subject image within the effective imaging region of the image sensor unit has become a maximum possible movement distance, by drive with only one image stabilization actuator (image stabilization section) of the first image stabilization actuator and the second image stabilization actuator (first image stabilization section and second image stabilization section), determines whether drive is possible with the other image stabilization actuator (image stabilization section), and if the result of this determination is that the other image stabilization actuator (image stabilization section) can be driven, drives that other image stabilization actuator (image stabilization section) (refer, for example, to S55-S59 in FIG. 10D).

The above described tracking control section, in a case where it is necessary to correct direction of a subject image by rotational drive of the image sensor unit to a proper position, initially rotates the subject image by driving the second image stabilization actuator (second image stabilization section) (refer to S53 in FIG. 10C), then drives the lens in a direction that is orthogonal to the optical axis of the lens by driving one of the first image stabilization actuator and second image stabilization actuator (first image stabilization section and second image stabilization section) (refer to S57 in FIG. 10D), and finally drives the image sensor unit in a direction that is orthogonal to the optical axis of the lens by driving the other of the first image stabilization actuator and second image stabilization actuator (first image stabilization section and second image stabilization section) (refer to S59 in FIG. 10D).

The body-side system controller 15 functions as a prediction section that predicts direction and movement amount that the subject will move per unit time, on an imaging region of the image sensor unit (refer to S21 and S27 in FIG. 10B). The body-side system controller 15 functions as an initial position calculation section that calculates initial position enabling tracking for the longest time within the effective imaging region of the image sensor unit, and initial position of the image sensor unit, based on the prediction section (refer to S21 and S27 in FIG. 10B). The body-side system controller 15 functions as a tracking control section that moves the lens and image sensor to initial positions by driving the first image stabilization actuator and second image stabilization actuator (first image stabilization section and second image stabilization section) based on output of the initial position calculation section, and commences tracking after the position of the subject image on the image sensor has been moved to an initial position where longest time drive becomes possible (refer to S29 in FIG. 10B). A tracking operation is repeated until immediately before determination as to whether or not the subject image is within the effective imaging region is negative, or until a time that has been designated (refer, for example, to S62 in FIG. 10D).

The body-side system controller 15 has been described as a determination section, calculation section, tracking control section, prediction section, and initial value calculation section, but in actual fact the body-side blur correction microcomputer 14, lens-side system controller 5, and lens-side blur correction microcomputer 4 share functions of each of these sections. Accordingly, the determination section, calculation section, tracking control section, prediction section, and initial value calculation section may be implemented using a plurality of processors, and may also be constructed using a single processor without being limited to a plurality of processors.

A communication section 19 has a communication circuit, and performs communication with sections external to the body 10. For example, image data that has been acquired in the image sensor 12 is transmitted to an external mobile telephone using Wi-Fi etc., and image data may be received from external sections. Besides this, sensor information such as GPS information from a mobile telephone may also be received from external devices. Also, communication is not limited to wireless communication, and wired communication with external units may also be performed using a USB terminal etc.

A release SW 20 is a switch that is linked to the release button, and on/off state of this switch is output to the body-side system controller 15. When a user instructs shooting preparation to the body 10 the release button is pressed down halfway, and when instructing shooting the release button is pressed down fully. If the release button is pressed down fully, the body 10 commences shooting. Besides the release SW 20, there is an operation member (interface) for the user to input instructions to the camera, in order to set shooting mode etc. As this operation member, there may be a touch panel. It is possible to set tracking mode, which will be described later, etc. using this operation member.

A GPS (Global Positioning System) sensor 21 is a satellite navigation system, detects current position on the earth, and outputs results of detection to the body-side system controller 15. An electronic viewfinder (EVF) 22 is a viewfinder with which it is possible observe a small-sized electronic monitor by means of an ocular window. As the EVF 22 it is possible to have a display monitor arranged on the outside of the body 10, and two types of EVF may be provided.

A memory card 23 is a storage medium having electrically rewritable non-volatile memory, and the user can insert and remove the memory card from the body 10. Image data that has been acquired using the image sensor 12 is stored in the memory card 23, and image data that has been stored can be read out. A clock circuit 24 measures calendar information and current time and date information, and these items of information are output to the body-side system controller 15.

Next, tracking astral bodies etc. by performing drive control of at least one of the first image stabilization section (lens-side image stabilization section) and the second image stabilization section (body-side image stabilization section) so that a subject image is always positioned at a specified position within the effective imaging region of the image sensor 12 will be described using FIG. 12.

In a state 120a, the image sensor 12 is capable of being moved by the image stabilization drive section 13 within a range of effective movable region IL. A region STA is an area in which a star the user has aimed at exists, within a pixel group of the image sensor 12. State 120b is a state where a tracking operation using the image stabilization drive section 13 (first image stabilization section) is not being performed, and shows a case where a subject image (for example, an astral body image such as a star) has been photographed over a long time. In this case, a trail STAT of the subject image is photographed.

In order to take a photograph of a subject in a stationary state, it is only necessary for the subject image to always be in the same position on the image sensor 12, that is, in the same pixel group on the image sensor 12. Therefore, in state 120c movement direction and movement velocity for the subject in the region STA (refer to MD for state 120c) is calculated. Tracking and shooting of the subject are performed by moving the image sensor 12 using the image stabilization section 13 based on the movement direction and movement velocity that have been calculated, as shown in state 120d and state 120e. By performing this tracking operation, the region STA in which the subject becomes at the same position on the image sensor 12. As a result, an image that appears to have been taken in a stationary state results, even if shooting of a subject such as a star that is moving is performed over a long time.

It should be noted that in the example shown in FIG. 12 the image sensor 12 has been moved. However, this is not limiting and the subject may be tracked by moving the image stabilization lens 2a using the image stabilization lens drive section 3, and also by using a combination of the two methods. In this case, drive of the image stabilization lens 2a is controlled by calculating movement velocity etc. based on IS sensitivity n, which will be described later using FIG. 7A to FIG. 7C. In any of these cases also, drive control may be performed such that a subject appears to be stationary at a particular pixel group on the image sensor.

Next, a positional relationship between the image sensor 12 and an image stabilization lens within the photographing lens 2 in a case where a first tracking mode has been set in the camera will be described using FIG. 2A to FIG. 2C. The first tracking mode corresponds to processing for a case where No has been determined in step S5 of FIG. 10A, which will be described later.

Figure 2A:
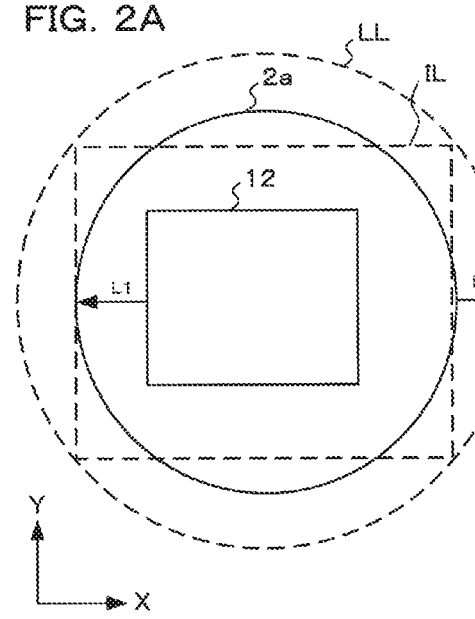
FIG. 2A to FIG. 2C are drawings showing a first example (first tracking mode) of movement range of an image sensor and an optical system, in the camera of one embodiment of the present invention.
Figure 2B:
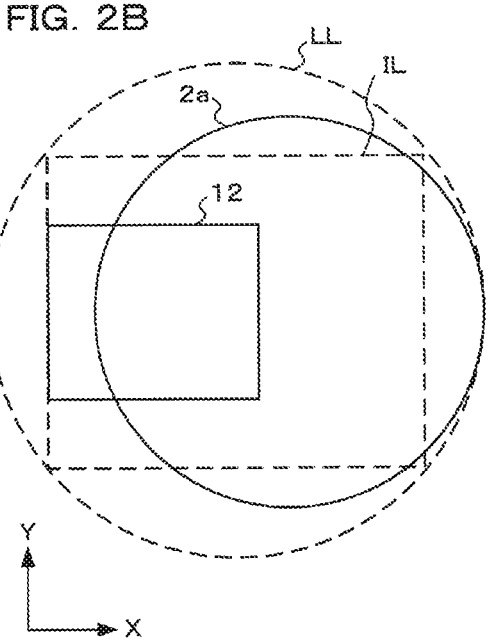
Figure 2C:
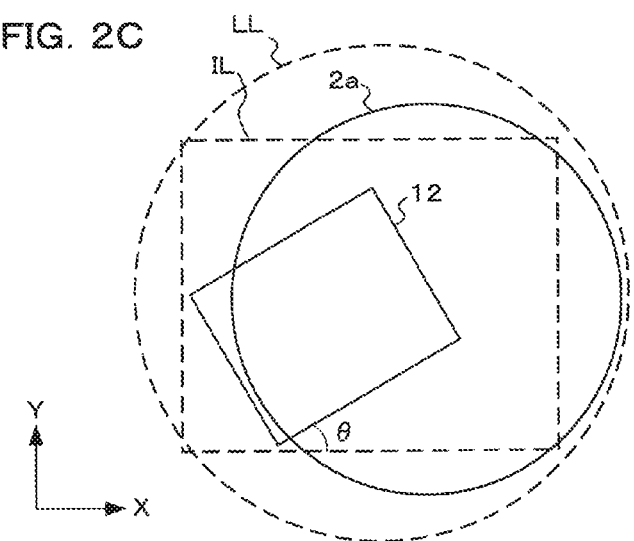

In FIG. 2A to FIG. 2C, the image sensor 12 is capable of being moved by the image stabilization drive section 13 within a range of image sensor effective movable region IL. Also, the image stabilization lens 2a of the photographing lens 2 is capable of being moved by the image stabilization lens drive section 3 within a range of a lens effective movable region LL. FIG. 2A has the center of the image sensor 12 aligned with the optical axis of the photographing lens 2, and also has center of the image stabilization lens 2a aligned with the optical axis of the photographing lens 2.

With the first tracking mode the image sensor 12 and the image stabilization lens 2a are both centered on the optical axis, and the image sensor 12 and the image stabilization lens 2a are separately moved so that image plane movement direction becomes appropriate. For example, looking from a position that is sufficiently far in the X axis direction and a Z axis direction (optical axis direction) that is orthogonal to the Y axis, if an optical system is considered in which, as relative offset between the centers of the image stabilization lens and the image sensor becomes larger an image becomes largely offset, then if the image sensor 12 and the image stabilization lens 2a are moved in opposite directions, as shown in FIG. 2B, a maximum image plane movement distance will become larger than moving only in one direction of the operating range. FIG. 2B is a drawing showing positions of the image stabilization lens 2a and the image sensor 12 after commencement of tracking from the state of FIG. 2A, where there is no rotation etc. of astral bodies, there is maximum movement in the X direction, and the maximum exposure time has elapsed. As a result, a maximum exposure time, for which tracking of an astral body image such as of stars etc. is possible, becomes long. Specifically, with the examples shown in FIG. 2A and FIG. 2B, if the X direction is considered, the image sensor 12 is capable of moving by L1 in the −X direction, and the image stabilization lens 2a is capable of moving by L2 in the +X direction. This means that for the purpose of tracking the astral body image it is possible to move by a distance of L1+L2.

FIG. 2C is a drawing showing positions of the image stabilization lens 2a and the image sensor 12 after commencing tracking from the state shown in FIG. 2A, for example, with an astral body group having also moved in a rotation direction about the optical axis on the image plane, and after a maximum exposure time has elapsed. In FIG. 2C the image sensor 12 has rotated by angle θ. As will be described later, the astral body image is driven to rotate by θ, in addition to being subjected to translational drive in the X axis direction and Y axis direction. Even if rotational drive is performed with the image stabilization lens 2a, it is not possible to make the astral body image stationary. Conversely, by rotating the body-side image sensor 12 it is possible to make the rotary motion of the astral body image stationary. At the body 10 side, in addition to the translational drive in the X axis direction and Y axis direction rotational drive in the θ direction is performed, and translational drive in the X axis direction and Y axis direction may also be performed at the lens barrel 1 side. Also, roles may be divided, by only performing rotational drive in the θ direction at the body 10 side, and only performing translation drive in the X axis direction and Y axis direction at the lens barrel 1 side.

With this embodiment, an optical system is assumed in which, looking from a position that is sufficiently far in a Z axis direction that is orthogonal to the X axis and Y axis, the larger relative offset between centers of the image stabilization lens and the image sensor becomes, the larger the offset in an image becomes. However, this is not limiting and it is possible to similarly consider an optical system in which the way in which an image is offset due to movement of the image stabilization lens becomes reverse. In this specification, in the embodiments introduced in the following also, it can be considered to be that the same idea is applied totally with movement amount of the image plane being focused on.

Next, a positional relationship between the image sensor 12 and an image stabilization lens within the photographing lens 2, in a case where a second tracking mode has been set in the camera, will be described using FIG. 3A to FIG. 3C. The second tracking mode corresponds to processing for a case where No has been determined in step S11 of FIG. 10A, which will be described later.

In FIG. 3A to FIG. 3C, the image sensor 12 is capable of being moved by the image stabilization drive section 13 within a range of the image sensor effective movable region IL. Also, the image stabilization lens 2a of the photographing lens 2 is capable of being moved by the image stabilization lens drive section 3 within a range of a lens effective movable region LL. Similarly to FIG. 2A, FIG. 3A has the center of the image sensor 12 aligned with the optical axis of the photographing lens 2, and also has center of the image stabilization lens 2a aligned with the optical axis of the photographing lens 2.

In the second tracking mode, for the purpose of long time tracking, before astral body tracking the image sensor 12 and the image stabilization lens 2a are moved, in an opposite direction to movement direction at the time of tracking an astral body image such as of stars, to a position taken as initial positions of the image stabilization lens 2a and the image sensor 12. In this case, the image sensor 12 and the image stabilization lens 2a are moved so that there is almost no relative image plane movement amount in the translation direction (ideally, 0). For example, in a case where the astral body image moves in movement direction Q, as shown in FIG. 3B, the image sensor 12 and the image stabilization lens 2a are moved in the −Q direction that is opposite to the Q direction. Also, at this time, the image sensor 12 is inclined at an angle θ formed by the movement direction and the X axis direction. With the second tracking mode, before commencement of shooting, the image sensor 12 and the image stabilization lens 2a are moved to a position so as to be touching the effective movable regions LL and IL (called initial position 1), as shown in FIG. 3B, and shooting commences after this movement (refer to S13 and S15 in FIG. 10A). It should be noted that the effective movable regions may also be defined as regions in which further physical movement is not possible, such as mechanical ends etc., and may be regions where position detection precision can be sufficiently assured.

An astral body image F1 is an image that has been taken with the image sensor 12 and image stabilization lens 2a of FIG. 3A. By comparison, an astral body image F2 is an image that has been taken with the image sensor 12 and image stabilization lens 2a of FIG. 3B. If only one of the image sensor 12 or the image stabilization lens 2a is driven, there is a possibility that the stars etc., that the user want to photograph will move out of the image plane, as shown in FIG. 3C. Therefore, both the image sensor 12 and the image stabilization lens 2a are moved (shifted) in the same direction so as to achieve a state where there is substantially no translational relative image plane movement amount (ideally, 0). If both the image sensor 12 and the image stabilization lens 2a are moved in the same direction, it is possible to extend exposure time while still projecting the astral bodies that it is desired to photograph onto the image plane.

With the second tracking mode of this embodiment, both the image sensor 12 and the image stabilization lens 2a are moved in either one direction with an initial operation, as shown in FIG. 2B. However, if either one, for example, only the image sensor 12, is moved to one end, an astral body image such as of stars will move out of the screen, as shown in FIG. 3C. Specifically, with the example shown in FIG. 3C, only the image sensor 12 is urged to a lower left end section of the image sensor effective movable region IL, and the image stabilization lens 2a still has its center position aligned with the center of the lens effective movable region LL. In this case, only stars ST1 and ST2 are within the frame of the astral body photograph F3, and star S3 is out of the frame. As a result, the user must change the direction in which the photographing lens is pointing and adjust so that the stars ST1 to ST3 enter into the frame.

Next, a positional relationship between the image sensor 12 and an image stabilization lens within the photographing lens 2, in a case where a third tracking mode has been set in the camera, will be described using FIG. 4A and FIG. 4B. The third tracking mode corresponds to processing for a case where Yes has been determined in step S11 of FIG. 10A, which will be described later.

With the third tracking mode, in comparison to the tracking using the second tracking mode, in order to perform tracking for an even longer time, movement direction and movement velocity of the astral bodies, and integrated values thereof, are calculated, and the image stabilization lens 2a and the image sensor 12 are respectively moved in a direction opposite to a direction of tracking the astral bodies. For example, after the above described calculations have been completed, the image sensor 12 is brought into contact with one side of the image sensor effective movable region IL based on the calculation results, as shown in FIG. 4A, while the image stabilization lens 2a is brought to the opposite side to the image sensor 12. Then, the movement directions of the image sensor 12 and the image stabilization lens 2a are respectively made opposite directions. For example, as shown in FIG. 4A, in a case where the astral body image is moving in a movement direction Q, the image sensor 12 is brought to a lower left end of the image sensor effective movable region IL, while the image stabilization lens 2a is brought to the upper right end of the lens effective movable region LL. The user performs compositional adjustment of the astral body image, such as of stars, in this state.

If the user has performed compositional adjustment in the state of FIG. 4A, then the camera offset correction microcomputer 14 again calculates image plane movement velocity based on current location based on GPS, shooting azimuth and shooting height, current time, focal length of the photographing lens etc. such that an astral body image that is being imaged on the image sensor 12 of the camera becomes stationary, and further calculates a maximum exposure time (shooting time). If a tracking operation has been commenced from the state of FIG. 4A, the image sensor 12 is moved in the Q direction, and the image stabilization lens 2a is moved in the −Q direction. Specifically, the image sensor 12 and the image stabilization lens 2a are moved in respectively opposite directions. The third tracking mode can use up to the maximum movable amount at both the body side and the lens side, by performing manual adjustment. It should be noted that if manual adjustment is omitted, (for example, omission of S25 to S31 in FIG. 10B, and calculation of maximum exposure time from the initial position 2 in step S31) there may be offset in position of the astral bodies. However, if the user is not concerned about the position of the astral bodies, celestial body shooting over a long time is possible by commencing exposure directly.

Figure 5:
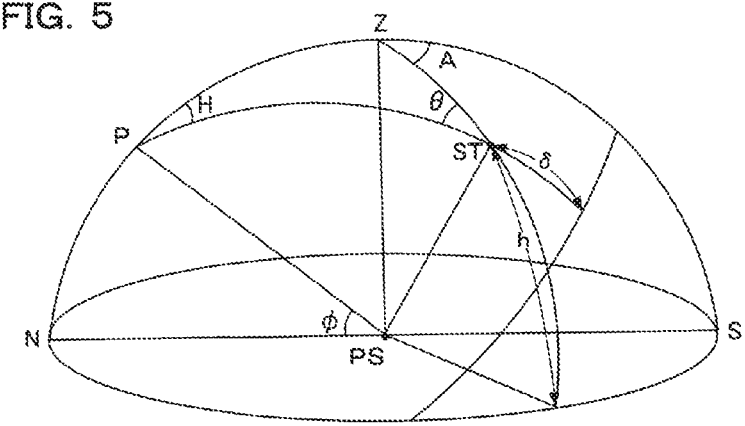
FIG. 5 is a drawing for describing movement of astral bodies and image plane movement velocity, in the camera of one embodiment of the present invention.

Next, movement of astral bodies and image plane movement velocity will be described using FIG. 5 to FIG. 9B. FIG. 5 is a drawing showing position relationship of astral bodies used at the time of calculating image plane speed. The user is at current position PS, and is attempting to shoot an astral body photograph of a star ST. Each position in FIG. 5 is as described below.

P: north celestial pole

Z: zenith

N: due north

S: due south

ST: target star (for convenience of description, this target star is at the center of the photographing screen, and is positioned on an extension line of the optical axis O of the photographing lens)

φ: latitude of current position

A: shooting azimuth (azimuth of star S that the photographing lens is aimed at, azimuth of an intersection of the optical axis of the photographing lens and the celestial sphere)

h: shooting height (height of star S that the photographing lens is aimed at, height of an intersection of the optical axis of the photographing lens and the celestial sphere)

H: hour angle (normally, units for hour angle uses hours, but here is handled by converting to angle (1 hour=15 degrees))

δ: declination of star S

θ: angle, on the celestial sphere, formed by a line that joins a celestial pole and the target star S (astral body) over the shortest distance, and a line that joins the zenith and the target star S (astral body) over the shortest distance.

Astral bodies rotate about the north celestial pole P, and in the case of shooting a star ST at shooting azimuth A and height h, a relationship between hour angle H and declination δ gives equations (1) and equation (2) below.

$$\tan H = \sin A / (\cos \theta \times \tan(h) + \sin \varphi \times \cos A) \quad (1)$$

$$\sin \delta = \sin(h) \times \sin \varphi - \cos(h) \times \cos \varphi \times \cos A \quad (2)$$

Figure 6:
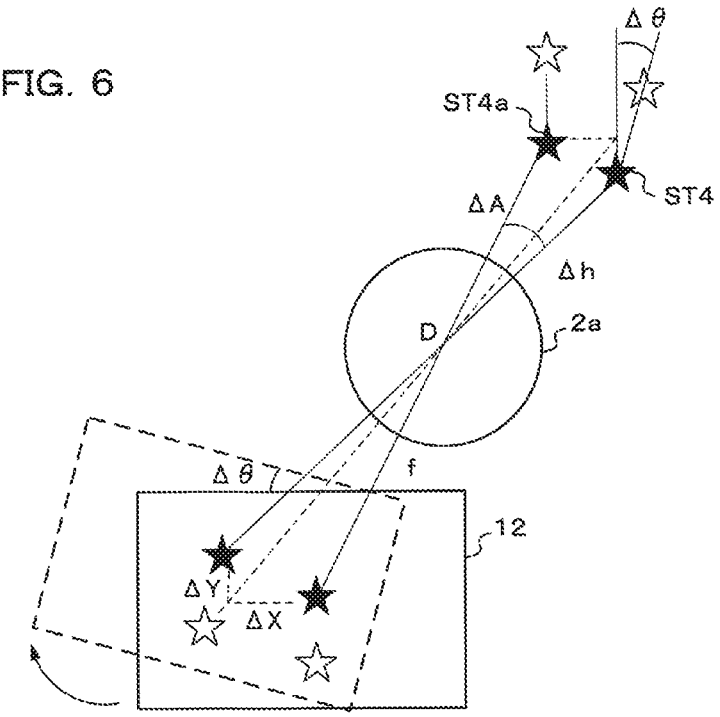
FIG. 6 is a drawing showing appearance of an astral body image moving on the image sensor due to diurnal motion, with the camera of one embodiment of the present invention.

FIG. 6 shows relationships between astral bodies ST4 and St4a, such as stars, the photographing lens 2 and the image sensor 12. Specifically, in a case where the star ST4 moves to the position of star ST4a after a specified time, it has moved by shooting azimuth ΔA and shooting height Δh, and is inclined with respect to the zenith at Δθ. Also, an image of star ST4 moves on the image sensor 12 by ΔX in the horizontal direction and ΔY in the vertical direction, and is inclined at Δθ. It should be noted that focal length of the photographing lens 2 is f, and optical axis center is O.

In order to calculate movement amount of an astral body such as a star, an amount that must be detected is a value such as described below.

shooting azimuth A . . . acquired from azimuth sensor (terrestrial magnetism sensor 16) etc.

shooting height h . . . acquired from gravitational force sensor (acceleration sensor 17, angular velocity sensor 18) etc.

position of camera (latitude φ) . . . acquired from GPS etc.

Change in shooting azimuth, change in shooting height, and change in angle per unit hour angle of the astral body can be calculated using the following equations.

$$dA/dH = \sin \varphi + \cos \varphi \times \tan(h) \times \cos A \quad (3)$$

$$dh/dH = -\sin A \times \cos \varphi \quad (4)$$

$$d\theta/dH = \cos A \times \cos \varphi / \cos(h) \quad (5)$$

It should be noted that when cos(h) is close to 0, a solution may also be obtained using equations shown in Japanese patent laid-open No. 2015-215427.

In actual fact, looking at star ST from the image sensor 12, since it appears that azimuth is changing at the same height h, azimuth change amount in a unit hour angle at the same height can be calculated using equation (6) below.

$$d\alpha/dH = \arccos(\sin^2(h) + \cos^2(h) \times \cos(dA/dH)) \quad (6)$$

However, dα is an azimuth angle change amount of an astral body that has changed at the same altitude for a unit hour angle.

Image plane movement amount in the X direction, Y direction and rotation direction on the image sensor 12 per hour angle can be calculated using equations (7) to (9) below, taking into consideration focal length f in the astral body movement amount described above.

$$\Delta X = f \tan(d\alpha/dh) \quad (7)$$

$$\Delta Y = f \tan(dA/dH) \quad (8)$$

$$\Delta \theta = d\theta/dH \quad (9)$$

It should be noted that equation (9) does not require tan because it is an angular dimension. Also, regarding the above described values, there may be cases where the camera is not inclined with respect to the earth's axis, but in a case where the camera is inclined calculation of that direction is different. In that case, calculation should take the inclination into consideration.

Using equations (7) to (9) described above, it is possible to calculated image plane movement velocity (ΔX, ΔY, Δθ) of an astral body such as a star on the image sensor 12. However, the values that have been calculated are not for movement amount of the image stabilization lens 2a and the image sensor 12. In order to track an astral body and shoot in a stationary state, it is necessary to obtain movement velocity of the image stabilization lens 2a and the image sensor 12. In order to track an astral body using the image stabilization lens 2a and the image sensor 12, there are three types of drive method. Before describing these three drive methods, IS sensitivity of an image stabilization unit (IS) will be described using FIG. 7A to FIG. 7C.

Figure 7A:
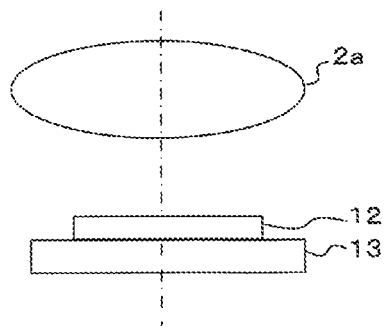
FIG. 7A to FIG. 7C are drawings for describing sensitivity of an image stabilization mechanism, in the camera of one embodiment of the present invention.

FIG. 7A shows a case where optical axis of the image stabilization lens 2a and center position of the image sensor 12 are aligned. Specifically, the movable section of the image stabilization unit (IS) within the lens barrel 1 is the image stabilization lens 2a, and the movable section of the image stabilization unit (IS) within the body 10 is the image sensor 12 that moves integrally with the image stabilization drive section 13.

Figure 7B:
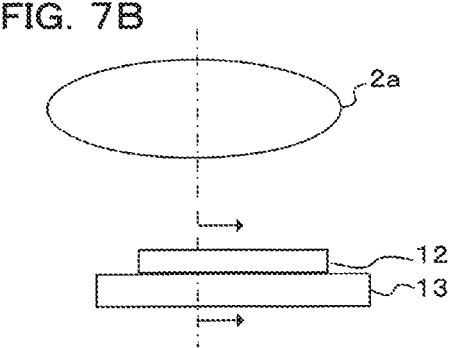

FIG. 7B shows a case where only the image stabilization unit (IS) within the body 10 is moved. In this case, the image stabilization lens 2a does not move but the image sensor 12, which is the image stabilization unit (IS) within the body 10 moves. If movement amount of the image stabilization unit (IS) within the body 10 is "1", then movement amount of the image sensor 12 is also "1", and IS sensitivity is "1".

Figure 7C:
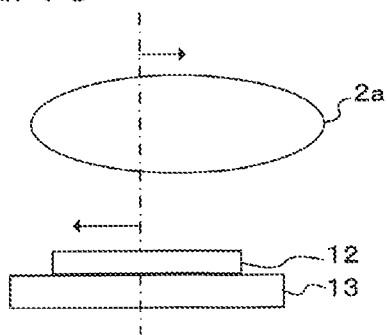

FIG. 7C shows a case where only the image stabilization unit (IS) within the lens barrel 1 is moved. In this case, image stabilization unit (IS) within the body 10 does not move, but the image stabilization lens 2a, which is the image stabilization unit (IS) within the lens barrel 1, does move. Even if the movement amount of the image stabilization unit (IS) within the lens barrel 1 is "1", offset amount of a light beam on the image sensor 12 becomes not "1", but "n". Since the image stabilization lens 2a is an optical lens, and refracts a light beam from a star, light beam offset amount on the image sensor 12 becomes not "1" but "n". This "n" is IS sensitivity.

Next, three drive methods for the image stabilization lens 2a and the image sensor 12 will be described. It should be noted that there may be cases where a rotation operation which is common to these methods is performed by the image sensor 12.

(1) First Drive Method

With the first drive method, rotation is performed by only the image sensor 12, and translational movement (movement in the X axis direction and Y axis direction) is performed by only the image stabilization lens 2a. A merit of this drive method is that calculations become simple. Also, by allocating only rotation to the body side image sensor 12, it is also possible to track an astral body that has movement in a rotation direction over a long time. Also, even in a case where digital resolution of a lens side position detection section and a body side position detection section are different, since drive is performed separately for the rotation direction and the translational direction, there is also the merit that errors are not conspicuous. It should be noted that in FIG. 10C and FIG. 10D, which will be described later, a second drive method is mainly adopted. However, in FIG. 10C and FIG. 10D, a case of flow with only steps S53→S55→S57→S61 (that is, when S55→S56→S59 is not executed) corresponds to the first drive method.

Speeds in the first drive method are as follows.
Lens side X direction velocity: ΔX
Lens side Y direction velocity: ΔY
Body side X direction velocity: 0
Body side Y direction velocity: 0
Body side rotation velocity: Δθ

It should be noted that equation (7) is referred to for ΔX, equation (8) is referred to for ΔY, and equation (9) is referred to for Δθ (this also applies to the second and third drive methods which will be described later).

(2) Second Drive Method

With the second drive method rotation is performed only at the body side, and translational drive in the X direction and Y direction is performed at the lens side. After drive has been completed at the lens side, drive at the body side is performed. Alternatively, conversely, after drive has been completed at the body side, drive at the lens side is performed. In a case where rotation amount at the body side is low and movable amount limit for the X and Y direction at the lens side has been reached before performing rotation, it is possible to prolong time for which shooting is possible by performing X and Y direction drive on the body side for the amount that is remained. It should be noted that as was described previously, in steps S53 to S61 in FIG. 10C and FIG. 10D, drive of the image stabilization section is performed using the second drive method.

Speeds in the second drive method are as follows.
Lens side X direction velocity: ΔX/n
Lens side Y direction velocity: ΔY/n
Body side X direction velocity: ΔX (not moving at the same time as lens side)
Body side Y direction velocity: ΔY (not moving at the same time as lens side)
Body side rotation velocity: dθ/dH As was described previously, movement for lens side X and Y direction and movement for body side X and Y direction are not performed at the same time. Also, "n" is the previously described sensitivity of the image stabilization unit (IS).

(2) Third Drive Method

With the third drive method rotation is performed only at the body side, and translational drive in the X direction and Y direction is performed at the lens side and at the body side simultaneously. The third drive method is basically the same as the second drive method. When performing translational drive in the X direction and Y direction, there is no point at which lens side and body side are switched, and level difference due to that portion does not arise. Also, since there is simultaneous operation, no effect of resolution difference of lens side and the body side position output is seen. It should be noted that, in steps S53 to S61 in FIG. 11A, drive of the image stabilization section is performed using the third drive method.

Speeds in the third drive method are as follows.

Lens side X direction velocity: $\Delta X/n * LX/(BX+LX)$ (10)

Lens side Y direction velocity: $\Delta Y/n * LY/(BY+LY)$ (11)

Body side X direction velocity: $\Delta X * BX/(BX+LX)$ (12)

Body side Y direction velocity: $\Delta Y * BY/(BY+LY)$ (13)

Body side rotation velocity: $d\theta/dH$ (14)

It should be noted that * means multiply.

It should be noted that BX and LX, and BY and LY are assignment coefficients for the X and Y directions at the lens side and the body side, respectively, and coefficients to give BX+LX=1 and BY+LY=1 are calculated. Also, in the first, second, and third drive methods, a camera shake signal may be provided, and the first, second, and third drive methods may also be used in a camera shake correction operation. In this way, with this embodiment, the first movement velocity, second direction, and second movement velocity of the image stabilization lens 2a and the image sensor 12 can be assigned during the above described first, second, and third drive methods, so that movable time becomes longest from movement amount and movement velocity of an image of a subject.

Next, limit of drive range of the image stabilization lens 2a and the image sensor 12 (movable amount limit), and maximum exposure time Tlim_FINAL, will be described using FIG. 8A to FIG. 9B. In FIG. 2A to FIG. 4B, drive range of the image stabilization lens 2a was shown with a circle, but here drive ranges of the image sensor 12 and the image stabilization lens 2a will be described as rectangles. Shape of the drive range is not limited to a circle or a rectangle, and may be any shape, and it is possible to obtain a movable amount limit in the same way as in the following description.

Figure 8A:
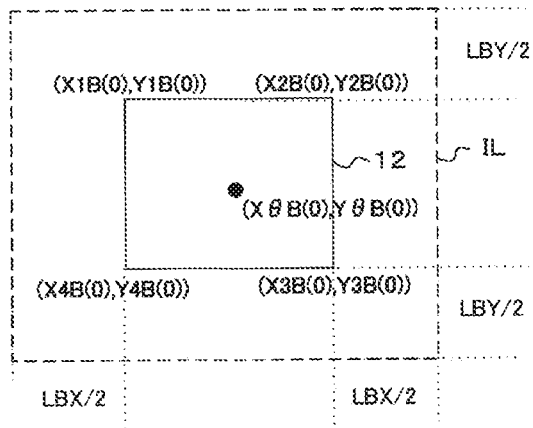
FIG. 8A to FIG. 8C are drawings for describing X direction and Y direction movable amount limits for the above described first and second examples, in the camera of one embodiment of the present invention.
Figure 8B:
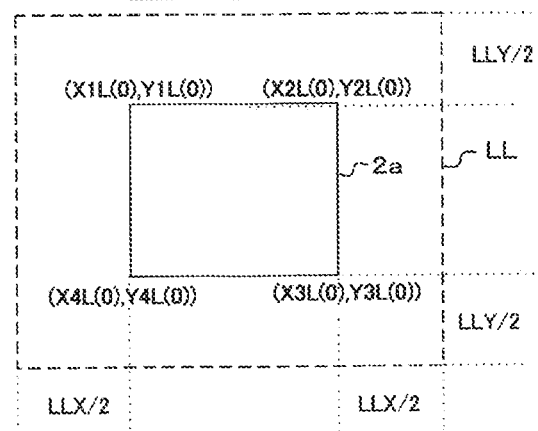
Figure 8C:
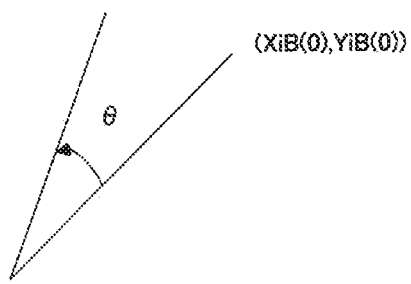

First, movable amount limit for a case where first tracking mode has been set will be described using FIG. 8A to FIG. 8C. In the first tracking mode movement is commenced from the center. Virtual maximum image plane movement amounts XLIM and YLIM are constituted by a sum of a body side effective movable region and a lens side effective movable region that takes into consideration IS sensitivity, and so can be given by equation (15) to equation (18) below. It should be noted that virtual maximum image plane movement amount XLIM_B corresponds to LBX/2 in FIG. 8A, and XLIM_A corresponds to LLX/2 in FIG. 8B.

$XLIM = XLIM\_B + XLIN\_L * n$ (15)

$= LBX/2 + n * LLX/2$ (16)

$YLIM = YLIM\_B + YLIN\_L * n$ (17)

$= LBY/2 + n * LLT/2$ (18)

Translational image plane movement amounts dXpi(t) and dYpi(t) at the vertex of a quadrangular movable section at time t can be given by equation (19) and equation (20) below.

$dXpi(t) = \int \Delta X dt$ (integration from 0~t) (19)

$dYpi(t) = \int \Delta Y dt$ (integration from 0~t) (20)

Also, if movement amounts resulting from rotation of the apex of a quadrangular movable section at time t are made dXBθi(t) and dYBθi(t), and initial centers of rotation are made YBθ(0), and YBθ(0), then equation (21) and equation (22) below are given.

$$dXB\theta i(t) = \cos\theta(t) * (XiB(0) - XB\theta(0)) - \\ \sin\theta(t) * (YiB(0) - YB\theta(0)) + X\theta B(0) - XiB(0) \quad (21)$$

$$dYB\theta i(t) = \cos\theta(t) * (YiB(0) - YB\theta(0)) + \\ \sin\theta(t) * (XiB(0) - XB\theta(0)) + Y\theta B(0) - YiB(0) \quad (22)$$

Accordingly, total movement amounts (dYi(t), dYi(t)) up to time t are given by equation (23) and equation (24) below.

$$dXi(t) = dXpi(t) + dXB\theta i(t) \quad (23)$$

$$dYi(t) = dYpi(t) + dYB\theta i(t) \quad (24)$$

Next, with condition i=1, 2, 3, 4 where image stabilization unit values (IS) are not expected set at each point within the drive range of the body and lens image stabilization units (IS), maximum txi and tyi values that satisfy $$XLIM - dXi(txi) > 0 \quad (25) \text{ and}$$

$$YLIM - dYi(tyi) > 0 \quad (25)$$

are calculated. Of all the values of txi and tyi that have been calculated, minimum values are made Tlim_tmp.

However, there is a possibility that at Tlim_tmp that has been calculated there is rotation in excess of a maximum rotation possible amount at the body side. Therefore, it is determined whether or not an image stabilization unit has come into contact with any point of the drive range on the body side due to rotation, and in a case where determination satisfies equation (26) and equation (27) below, it is determined that the image stabilization unit (IS) has not come into contact with any point of the drive range.

$$XLIM\_B - dXB\theta i(Tlim\_tmp) > 0 \quad (26)$$

$$YLIM\_B - dYB\theta i(Tlim\_tmp) > 0 \quad (27)$$

It should be noted that in this case it is best to prioritize moving in the X direction and the Y direction at the lens side before moving in the X direction and Y direction at the body side. While it is possible to rotate the body side image sensor 12, it is only possible to translate the lens barrel side image stabilization lens 2a. This means that if the lens side is used for a translational component, after that further long time exposure becomes possible by causing movement for translational component and rotational component in the image sensor 12.

In a case where equations (26) and equation (27) described above are not satisfied, maximum txi and tyi values that satisfy equation (28) and equation (29) below are calculated. Of all the values of txi and tyi that have been calculated, minimum values are made Tlim_FINAL. Tlim_FINAL is made final exposure time, and in a case where an exposure time that exceeds this has been set, the exposure time is clipped to the final exposure time.

$$XLIM\_B - dXB\theta i(tix) > 0 \quad (28)$$

$$YLIM\_B - dYB\theta i(tiv) > 0 \quad (29)$$

Next, movable amount limit for a case where second tracking mode has been set will be described using FIG. 8A to FIG. 9B. In the second tracking mode, as was described previously, the body side image stabilization unit and the lens side image stabilization unit are moved to an initial position 1. With this second tracking mode, the user can adjust shooting direction midway. Also, with the second tracking mode it is possible to make exposure time longer compared to the first tracking mode. Description will be given of an example of calculating initial position 1 of the body side and the lens side. It should be noted that similarly to the description of movable amount limit for the case of the first tracking mode, description will be given with drive range of the body side image stabilization unit and the lens side image stabilization unit as a rectangle. Shape of the drive range is not limited to a circle or a rectangle, and may be any shape, and it is possible to obtain a movable amount limit in the same way as in the following description.

First, a case where the body side image sensor 12 is not rotated at the initial position will be described. Movement amount that will not be used by the lens when first tracking mode is assumed, is calculated.

$$n*LLX/2 - |dXpi(Tlim\_FINAL)| > 0 \quad (30)$$

$$n*LLY/2 - |dYpi(Tlim\_FINAL)| > 0 \quad (31)$$

When equation (30) described above is satisfied and equation (31) described above is satisfied, rotation direction movement amount becomes a bottleneck, not translational direction movement amount, and maximum exposure time is determined as an upper limit. Final exposure time Tlim_FINAL is recalculated based on this movement amount. By performing rotational movement in an opposite direction to astral body tracking movement direction before operations during shooting, it is possible to increase exposure time.

Exposure time for a case where the body side image stabilization unit (image sensor 12) has been subjected to rotational movement is calculated. First, maximum tx and ty that satisfy equations (32) and (33) below are calculated, and minimum values tθ for tx and ty are calculated. Angle θ at this time is calculated.

$$XLIM\_B > dXB\theta i(tx) \quad (32)$$

$$YLIM\_B > dYB\theta i(ty) \quad (33)$$

By making a position that has been rotated by θ in the opposite direction to rotation tracking an initial position, rotation movable amount is then increased. By only performing a rotation operation from a −θ initial position, time until the movable limit is reached is similarly calculated, and this time is made final exposure time Tlim_tmp.

A method of calculating final exposure time Tlim_tmp using equation (32) and equation (33) described above can make exposure time double if there is only rotation. However, there may be cases where exposure time is not affected by a rotation operation, and is affected by a translation operation. In this case, in the event that both of equation (34) and equation (35) below are satisfied, maximum exposure time becomes Tlim_FINAL=Tlim_tmp.

$$n*LLX/2 - |dXpi(Tlim\_tmp)| > 0 \quad (34)$$

$$n*LLY/2 - |dYpi(Tlim\_tmp)| > 0 \quad (35)$$

Also, if equation (34) below is not satisfied, that is, if equation (36) is satisfied, remaining image plane movement is calculated with equations (37) and (38) below.

$$n*LLX/2 - |dXpi(Tlim\_tmp)| < 0 \quad (36)$$

$$XZ\_RESTi = n*LLX/2 - |dXpi(Tlim\_tmp)| \quad (37)$$

$$YZ\_RESTi = n*LLY/2 - |dYpi(Tlim\_tmp)| \quad (38)$$

Similarly, positions at each apex of the body movable section at time Tlim_tmp are calculated, and remaining XB_RESTi and YB_RESTi until the movable limit from that point are calculated. If remaining XB_RESTi for up to the body side movable limit for the image plane movement direction exceeds XZ_RESTi, it is possible to increase exposure time by the extent of that excess.

Also, if equation (35) below is not satisfied, that is, if equation (39) is satisfied, remaining image plane movement is calculated with equation (38) below.

$$n*LLY/2-|dYpi(Tlim\_tmp)|<0 \tag{39}$$

$$YZ\_RESTi=n*LLY/2-|dYpi(Tlim\_tmp) \tag{38}$$

Similarly, positions at each apex of the body side movable section at time Tlim_tmp are calculated, and remaining YB_RESTi up the movable limit from that point is calculated. If remaining YB_RESTi for up to the body side movable limit for the image plane movement direction exceeds YZ_RESTi, it is possible to increase exposure time by the extent of that excess.

All the same, if each apex of the movable section is not contacted, initial value is changed by negligible quantity dθ from −θ, and the same calculation is performed in that state. This is repeated, a condition and an initial position that give the longest exposure time with both rotation direction and the translational direction is calculated, and maximum exposure time is then calculated. At this time, calculation may be performed by changing initial position of the movable section of the body side image stabilization unit (IS), and the lens side image stabilization unit (IS) is also moved by the extent to which the body side image stabilization unit (IS) was moved for other than rotation direction taking into consideration IS sensitivity.

Next, movable amount limit for a case where third tracking mode has been set will be described. As was described previously, with the third tracking mode the image stabilization lens 2a and the image sensor 12 are respectively moved in directions opposite to directions for tracking the astral body, based on movement direction and movement velocity of an astral body, and the integrated values thereof, and the resultant position is made initial position. For example, the body side image stabilization unit is brought to one side of the effective movable region IL based on a result of the above described calculation, and the lens side image stabilization unit is brought to the opposite side, and these positions are made initial positions. The body side image stabilization unit and the lens side image stabilization unit are then respectively moved in opposite directions from these initial positions. Compared to the case of the second tracking mode, in the case of the third tracking mode it is possible to make the exposure time longer.

With the third tracking mode, first, similarly to the normal operation of the first tracking mode, movement of each vertex is calculated. Next, assuming that movable sections of respective image stabilization units of the body and the lens are at movable limit ends for the opposite direction to the tracking direction, movement of each vertex from that position is calculated. Then, maximum exposure time at which each image stabilization unit does not reached each movable limit is calculated.

Movable sections are then moved to movable limit ends, and the user is urged to perform fine angle of view adjustments again. Initial positions 3 of the image stabilization lens 2a of the lens side image stabilization unit and the image sensor 12 of the body side image stabilization unit, that can make exposure times long compared to the case of tracking in the first tracking mode, without moving shooting direction in either the X direction or the Y direction, are calculated based on astral body parameters and parameters within the body and the lens.

Calculation of a locus from a finely adjusted position is performed for the movable section (image sensor 12) of the body side image stabilization unit, and in a case where the movable section does not reach a movable end as a result of rotation the exposure time at that time is made the maximum exposure time. In the event that the movable section reaches the movable end, the movable section is moved slightly inwards, positional adjustment of the movable section is performed so as not to reach the movable end, and recalculation of exposure time form that point is performed.

Next, a celestial body shooting operation of this embodiment will be described using the flowcharts shown in FIG. 10A to FIG. 10E. This flow is implemented by a CPU within the body-side system controller 15 controlling each section within the body 10 and the lens barrel 1 in accordance with programs that have been stored in memory. Control within the lens barrel 1 is performed by a CPU within the body-side system controller 15 through the CPU within the lens-side system controller 5. It should be noted that in a case where the lens barrel 1 is an interchangeable lens barrel, then at the time of attaching the interchangeable lens barrel to the camera body, lens information such as focal length f, sensitivity n etc. of the photographing lens 2 is transmitted from the interchangeable lens barrel to the camera body.

If the flow for celestial body shooting shown in FIG. 10A is commenced, first the image stabilization units are returned to the center (S1). Here, the lens-side blur correction microcomputer 4 moves the image stabilization lens 2a to the venter of a drive range by controlling the lens drive section 3 Refer to FIG. 2A). Also, the body-side blur correction microcomputer 14 moves the image sensor 12 to the center of a drive range by controlling the image stabilization drive section 13 (refer to FIG. 2A).

Then, azimuth A, height h, and latitude φ are acquired from each sensor, as astral body position parameters, and focal length information is acquired (S3). Here, azimuth A, height h and latitude φ of the star ST are acquired as astral body position parameters (refer to FIG. 5). Azimuth A and height h are calculated based on outputs of the terrestrial magnetism sensor 16, acceleration sensor 17 and angular velocity sensor 18. Latitude φ is acquired using the GPS sensor 21.

Next, it is determined whether or not the camera is in long time exposure mode (S5). With this embodiment, at the time of tracking an astral body the user can set long time exposure mode in advance by operating an operation section of the body 10. If long time exposure mode has not been set, astral bodies are tracked using the previously described first tracking mode, and celestial body shooting is performed. If long time exposure mode has been set, astral bodies are tracked using the previously described second or third tracking mode and celestial body shooting is performed. The user performs appropriate setting of tracking mode in accordance with the exposure time they want to use.

If the result of determination in step S5 is that long time exposure mode has not been set, maximum exposure time Tlim_FINAL from the center position is calculated (S7). In this step, maximum exposure time Tlim_FINAL for the first tracking mode that was described using FIG. 8A to FIG. 8C is calculated. Specifically, the CPU within the body-side blur correction microcomputer 14 or within the body-side system controller 15 calculates maximum exposure time Tlim_FINAL required to move from a center position to a movable limit in a state where an initial operation will not be performed, based on movement velocity of the astral body. In this tracking mode, the center position represents the initial position.

If the result of determination in step S5 is that long time exposure mode is set, it is next determined whether or not to finely adjust shooting direction manually (S11). As was described previously, maximum exposure time in the third tracking mode can be made longer compared to the maximum exposure time in the first and second tracking modes. However, with the third tracking mode, if the image sensor 12 and the image stabilization lens 2a are moved to the movable limit, there is a possibility that some of the astral bodies that the user is interested in will protrude from the photographing screen (refer to image F3 in FIG. 3C). In this type of case, composition is temporarily changed, and after getting the astral bodies of interest into the photographing screen the maximum exposure time is calculated and tracking is performed. The user can set the second tracking mode or the third tracking mode using the operation section. In this step, celestial body shooting is performed with the third tracking mode in which shooting direction is finely adjusted, but alternatively whether or not to perform celestial body shooting in the second tracking mode, in which fine adjustment of the shooting direction is not required, may be determination based on user setting.

If the result of determination in step S11 is to not finely adjust shooting direction manually, initial position 1 of the lens and the body is calculated (S13). Here, a CPU within the body-side blur correction microcomputer 14 or within the body-side system controller 15 calculates initial position 1 of the body and the lens that can make exposure time longer than in the case of tracking with the first tracking mode, without changing the shooting direction, based on astral body position parameters that have been acquired in step S3 and parameters within the body and parameters within the lens. As was described using FIG. 3B, with the second tracking mode the image stabilization lens 2a and the image sensor 12 are moved to initial position 1 where they reach one end of respective effective movable regions LL and IL. In this step, this initial position 1 is calculated. It should be noted that as the initial position 1, there are initial position of the lens side image stabilization lens 2a, and initial position of the body side image sensor 12. Here, the initial positions of the lens side and the body side are collectively referred to as initial position 1.

If initial position 1 has been calculated in step S13, there is movement to the initial position 1 as an astral body tracking operation (S15). Here, the body-side blur correction microcomputer 14 moves the image sensor 12 to the initial position 1 using the image stabilization drive section 13. Also, the lens-side blur correction microcomputer 4 moves the image stabilization lens 2a to the initial position 1 using the image stabilization lens drive section 3 (refer to FIG. 3A to FIG. 3C).

Once there has been movement to the initial position 1, maximum exposure time Tlim_FINAL is calculated from initial position 1 (S17). In this step, maximum exposure time Tlim_FINAL for the second tracking mode that was described using FIG. 8A to FIG. 9B is calculated. Specifically, the CPU within the body-side blur correction microcomputer 14 or within the body-side system controller 15 calculates maximum exposure time Tlim_FINAL required to move from initial position 1 to a movable limit, based on movement velocity of the astral body.

If the result of determination in step S11 is to not finely adjust shooting direction manually, initial position 2 of the lens and the body is calculated (S21). Here, a CPU within the body-side blur correction microcomputer 14 or the body-side system controller 15 calculates initial position 2 of the body and the lens that can make exposure time longer than in the case of the second tracking mode, in a state where the shooting direction is changed, based on astral body parameters that have been acquired in step S3 and parameters within the body and parameters within the lens. As was described using FIG. 4A and FIG. 4B, in the third tracking mode there is movement to initial position 2 where the image stabilization lens 2a reaches one end of the effective movable region LL and the image sensor 12 reaches the other end of the effective movable region IL. In this step, this initial position 2 is calculated.

If initial position 2 has been calculated, there is movement to the initial position a as an astral body tracking operation (S23). Here, the body-side blur correction microcomputer 14 moves the image sensor 12 to the initial position 2 using the image stabilization drive section 13. Also, the lens-side blur correction microcomputer 4 moves the image stabilization lens 2a to the initial position 2 using the image stabilization lens drive section 3. It should be noted that as the initial position 2, there are initial position of the lens side image stabilization lens 2a, and initial position of the body side image sensor 12. Here, the initial positions of the lens side and the body side are collectively referred to as initial position 2.

If the image sensor 12 and image stabilization lens 2a have been moved to initial position 2, display to urge the user to perform fine adjustment of the shooting direction is performed. As was described previously, with the third tracking mode, since there is a possibility of some of the astral bodies protruding from the photographing screen, a dialog box that urges the user to finely adjust the shooting direction is displayed on the EVF 22. Also, if fine adjustment has been completed, display is performed so as to have the user perform operation of an OK button etc.

It should be noted that even if fine adjustment of the shooting direction is not performed by the user, maximum exposure time Tlim_FINAL may be calculated in a state where the first and second image stabilization sections are held at initial position 2. Specifically, it is possible to omit S25 to S29 in FIG. 10B and calculate maximum exposure time Tlim_FINAL for initial position 2 in S31, advance to step S41 and then perform a tracking operation. In this case, since shooting direction is not finely adjusted by the user, there is a possibility that an astral body such as a star will move out from within the screen. However, if the user is not worried about this it is possible to achieve a maximum tracking time. In this case, the body-side system controller 15 functions as a tracking control section that repeatedly performs a tracking operation, to move the image stabilization lens and the image sensor unit in an opposite direction to a tracking direction on an image plane, make that position a second initial position, recalculate movement direction and movement velocity from the second initial position, drive one of the first image stabilization actuator or the second image stabilization actuator (first image stabilization section or second image stabilization section) at a first movement velocity to shift the subject image in a first direction within the effective imaging region, and drive the first image stabilization actuator or the second image stabilization actuator (first image stabilization section or second image stabilization section) at a second movement velocity at the time it has been determined that further shift is possible to shift the subject image in second direction within the effective imaging region, until an exposure time is reached.

Once fine adjustment has been completed by the user, an initial position 3 of the lens and the body is next calculated. Here, the CPU within the body-side blur correction microcomputer 14 or the body-side system controller 15 calculates an initial position 3 by referencing the position that has been finely adjusted by the user. This initial position 3 is a position of the lens and body at which the exposure time is made long compared to the case of the second tracking mode, without changing the shooting direction based on astral body parameters that were obtained in step S3 and parameters within the body and parameters within the lens. Calculation of a locus from initial position 3 that has been finely adjusted is performed, and in a case where the end parts of the effective movable regions have not been reached as a result of rotational movement, the time taken to move to that point is made maximum exposure time. In the event that an end of the effective movable region is reached, the movable section is moved slightly inwards, positional adjustment of the movable section is performed so as not to reach the end, and recalculation of exposure time from that point is performed.

If initial position 3 has been calculated, there is movement to the initial position 3 as an astral body tracking operation (S29). Here, the body-side blur correction microcomputer 14 moves the image sensor 12 to the initial position 3 using the image stabilization drive section 13. Also, the lens-side blur correction microcomputer 4 moves the image stabilization lens 2a to the initial position 3 using the image stabilization lens drive section 3. It should be noted that as the initial position 3, there are initial position of the lens side image stabilization lens 2a, and initial position of the body side image sensor 12. Here, the initial positions of the lens side and the body side are collectively referred to as initial position 3.

Once there has been movement to the initial position 3, maximum exposure time Tlim_FINAL is calculated from initial position 3 (S31). In this step, maximum exposure time Tlim_FINAL for the third tracking mode is calculated. Specifically, the CPU within the body-side blur correction microcomputer 14 or the body-side system controller 15 calculates maximum exposure time Tlim_FINAL required to move from initial position 3 to a movable limit, based on movement velocity of the astral body.

If maximum exposure time Tlim_FINAL has been calculated in step S7, S17 or S31, it is next determined whether or not exposure time is within Tlim_FINAL (S41). The user sets exposure time before celestial body shooting, by operating the operation section. In this step, it is determined whether or not an exposure time that has been set is within the maximum exposure time Tlim_FINAL that was set in steps S7, S17 or S31.

If the result of determination in step S41 is that exposure time is not within the maximum exposure time Tlim_FINAL, exposure time is set so that exposure time=Tlim_FINAL (S43). The camera can track the star ST that is aimed at until the maximum exposure time Tlim_FINAL. However, if the exposure time that has been set by the user exceeds the maximum exposure time Tlim_FINAL, it is not possible for the camera to track the star ST that is aimed at. The body-side system controller 15 therefore restricts exposure time to Tlim_FINAL.

If resetting of exposure time has been performed in step S43, or if the determination result in step S41 was Yes, exposure is commenced (S45). Here, if the user operates the release button and the release SW 20 is turned on, the body-side system controller 15 opens the shutter 11 and subjects a subject image to photoelectric conversion in the image sensor 12.

If exposure has been commenced, next azimuth A, height h, latitude φ and focal length f are acquired from each sensor, as astral body position parameters (S47). If the camera has commenced exposure, tracking of the astral bodies commences in step S47 and after. First, similarly to step S3, the newest of various parameters are acquired from each sensor.

Then, astral body movement velocities dA/dH, dh/dH and dθ/dH are calculated from the astral body position parameters (S49). Here, the CPU within the body-side blur correction microcomputer 14 or the body-side system controller 15 calculates dA/dH using equation (3) described previously, calculates dh/dH using equation (4), and calculates dθ/dH using equation (5).

Then, image plane astral body movement amounts per unit hour angle ΔX, ΔY and Δθ are calculated from astral body movement velocities (S51). Here, the CPU within the body-side blur correction microcomputer 14 or the body-side system controller 15 calculates ΔX using equation (7) described previously, calculates ΔY using equation (8), and calculates Δθ using equation (9).

If image plane astral body movement amounts have been calculated, it is next determined whether or not the body movable section position with within a movable limit (S52). Here, it is determined whether or not the image stabilization drive section 13 is within the effective movable region of the image sensor 12. If the result of this determination is within the movable limit, the body movable section is drive controlled at Δθ (S53). Here, the body-side blur correction microcomputer 14 performs rotational control of the image sensor 12 using the image stabilization drive section 13, at Δθ that was calculated in step S51.

Once drive control has been performed in step S53, or if the result of determination in step S52 is that the body movable section position is not within the movable limit, it is determined whether or not the lens movable section position is within a movable limit (S55). Here, the body-side blur correction microcomputer 14 determines whether or not ΔX and ΔY that were calculated in step S51 are within the effective movable region LL for the image stabilization lens 2a.

If the result of determination in step S55 is within the movable limit, the lens movable section is subjected to drive control at ΔX/n, ΔY/n (S57). Here, in a case where the image stabilization lens drive section 3 drives the image stabilization lens 2a, movement amounts of the image stabilization lens are calculated by dividing astral body movement amounts ΔX and ΔY by IS sensitivity n, as was described using FIG. 7C. The lens-side blur correction microcomputer 4 drives the lens movable section (image stabilization lens 2a) based on the calculated movement amounts, using the image stabilization lens drive section 3.

On the other hand, if the result of determination in step S55 is not within the movable limit, it is determined whether or not the body movable section position is within the movable limit (S56). Here, it is determined whether or not the image stabilization drive section 13 is within the effective movable region of the image sensor 12. If the result of this determination is within the movable limit, the body movable section is drive controlled at ΔX and ΔY (S59). Here, in a case of driving the image sensor 12, which is the body movable section, the body-side blur correction microcomputer 14 drives the image sensor 12 based on astral body movement amounts $\Delta X$ and $\Delta Y$ that were calculated in step S51.

If the lens movable section has been driven in step S57, or if the body movable section has been driven in step S59, it is next determined whether or not the exposure time has elapsed (S61). Here, the CPU within the body-side blur correction microcomputer 14 or the body-side system controller 15 determines whether or not an exposure time that was set by the user, or an exposure time that was set in step S43, has been reached from commencement of exposure in step S45.

If the result of determination in step S61 is that exposure time has not elapsed, it is determined whether or not both the body movable section and the lens movable section were moved in an operation immediately prior (S62). If the exposure time at which exposure is complete has not elapsed, then if the lens side image stabilization section and the body side image stabilization section have both moved up to the movable limits, it will not be possible to perform the tracking operation. In this step the body-side system controller 15 performs determination based on the operating states of the two image stabilization sections. If the result of this determination is that neither of the image stabilization sections have reached the movable limits, step S47 is returned to and exposure continues.

If the result of determination in step S61 is that exposure time has elapsed, or if the result of determination in step S62 is that both of the body movable section and the lens movable section have not moved, exposure is completed (S63). Here, the body-side system controller 15 closes the shutter 11 and exposure is completed.

Taken image data is acquired (S65). Here, the body-side system controller 15 reads out taken image data from the image sensor 12. Next, image processing is performed (S67). Here, an image processing circuit that is provided within the body-side system controller 15 applies image processing to taken image data that was read out in step S65.

If image processing has been performed, next a taken image is displayed on a monitor, and the taken image is stored in the memory card (S69). Here, a taken image is displayed on the EVF 22 using taken image data that was subjected to image processing in step S67. Also, taken image data that has been subjected to image processing for storage is stored in the memory card 23.

In this way, in the flowchart for celestial body shooting of this embodiment, if it is not long time exposure mode (S5 No) the body-side system controller 15 performs a tracking operation after moving the image stabilization lens 2a and the image sensor 12 about the center of the optical axis of the photographing lens (refer to FIG. 2A to FIG. 2C). Also, body-side system controller 15 calculates the maximum exposure time at this time (refer to S7), and if this maximum exposure time is longer than a set exposure time this maximum exposure time is made a limit time (refer to S41 and S43).

Also, in the flowchart for celestial body shooting of this embodiment, in the case of long time exposure mode the body-side system controller 15 determines whether or not to perform fine adjustment of shooting direction (refer to S11) after having moved the image stabilization units to an initial position. Then, if fine adjustment of shooting direction is not performed, a tracking operation is performed after moving the image stabilization lens 2a and the image sensor 12 to initial position 1, that is to different ends of respective effective movable regions LL and IL (refer to S13 and S15 in FIG. 3B). Also, the body-side system controller 15 calculates the maximum exposure time at this time (refer to S17), and if this maximum exposure time is longer than a set exposure time, this maximum exposure time is made a limit time (refer to S41 and S43).

Also, in the flowchart for celestial body shooting of this embodiment, the body-side system controller 15 moves the image stabilization lens 2a and the image sensor 12 to initial position 2, namely to the same end of respective effective movable regions LL and IL (refer to S21 and S23 in FIG. 4A), after having moved the image stabilization units to initial positions, if fine adjustment of shooting direction may be performed (S11 Yes). After that, if shooting direction has been finely adjusted by the user, the body side controller 15 calculates locus of an astral body from this fine adjustment, and if the movable section (image sensor 12) has not reached the effective movable region IL as a result of rotation, the time required to move the movable section to that position is made maximum exposure time. On the other hand, if the movable section does not reach the effective movable region IL, the body side controller 15 moves the movable section slightly inwards and performs position adjustment of the movable section until the effective movable region is reached. If it is determined to be a position of the movable section that has not reached the effective movable region, exposure time is calculated again from that position (S27 to S31).

Also, in the flowchart for celestial body shooting of this embodiment, the body side controller 15 executes astral body tracking in step S47, if exposure has commenced in step S45. First, in step S47 to S51, the body side controller 15 calculates image plane astral body movement amounts ($\Delta X$, $\Delta Y$, $\Delta \theta$) for the purpose of tracking, based on astral body position parameters etc. If image plane movement amounts have been calculated, it is determined whether or not the body movable section is within a movable limit range (S52, S55), and if the body movable section is within the movable limit range performs drive using the body movable section (S56, S59). Also, it is determined whether or not the lens movable section is within a movable limit range (S55), and if the lens movable section is within the movable limit range drive is performed using the lens movable section (S57). If drive has been performed by the image plane astral body movement amounts ($\Delta X$, $\Delta Y$, $\Delta \theta$) in steps S52 to S59, step S47 is returned to again, image plane movement amounts are calculated again, and tracking of the astral bodies continues by performing drive using the body movable section and the lens movable section.

Also, in the flowchart for celestial body shooting of this embodiment, a tracking operation is performed wherein when the determination section has determined that it is possible for the subject image to exist within an effective imaging region (S55 Yes or S56 Yes), the body side controller 15 drives one of the first image stabilization section (lens movable section) or second image stabilization section (body movable section) at a first movement velocity to shift the subject image in a first direction within an effective imaging region (S57 or S59), and after the shift, (S62 No), if the determination section has determined that further shift is possible (S56 Yes, or S55 Yes) drives the other of the first image stabilization section or the second image stabilization section at a second movement velocity to shift the subject image in a second direction within the effective imaging region.

It should be noted that in the flowchart shown in FIG. 10D, whether or not the lens movable section is within the movable limit is determined first (refer to S55), but determination as to whether or not the body movable section is within the movable limit may be performed first. Specifically, although, as an order in which to drive the image stabilization sections (image stabilization movable sections (image stabilization drive section 13 for the image sensor 12 and image stabilization lens drive section 3 for the image stabilization lens 2a)) the body side controller 15 first drives the lens movable section (image stabilization lens drive section 3 for the image stabilization lens 2a) and after that drives the body movable section (image stabilization drive section 13 for the image sensor 12), this order may be reversed.

Figure 11B:
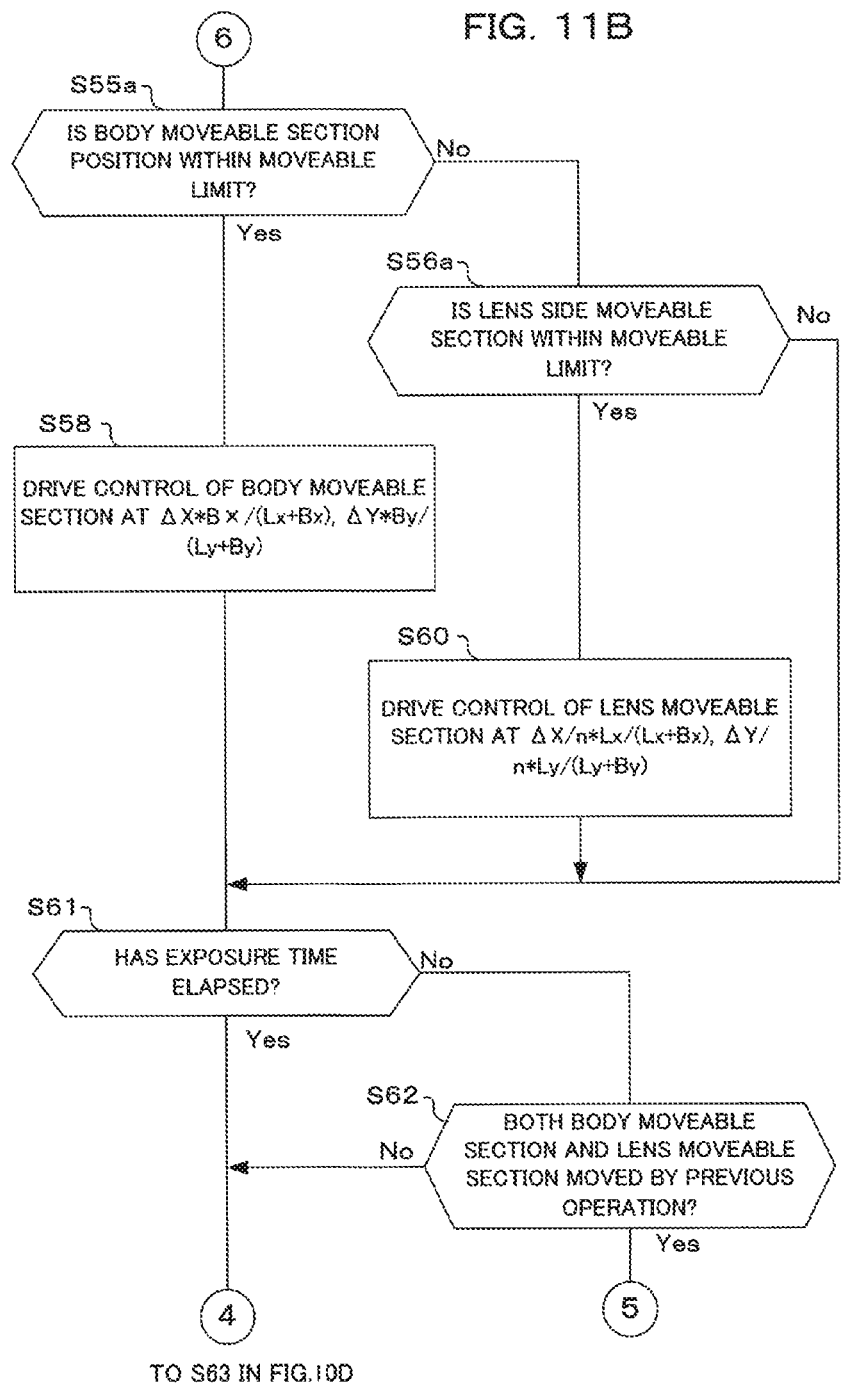

Next, a modified example of the operation for celestial body shooting that was shown in FIG. 10A to FIG. 10E will be described using the flowchart shown in FIG. 11A and FIG. 11B. With the flow shown in FIG. 10A to FIG. 10E, in a case where positional resolutions of the lens and the body are significantly different, if body tracking drive is performed after lens tracking drive resolution in the X direction and the Y direction will differ between initial and advanced exposure, and there is a possibility of effects being seen in a taken image. Therefore, the modified example shown in FIG. 11A and FIG. 11B improves this point. This modified example has steps S55 to S59 in FIG. 10D replaced with steps S56 to S58 in FIG. 11B. Description will therefore concentrate on this point of difference.

Image plane astral body movement amounts $\Delta X$, $\Delta Y$ and $\Delta \theta$ are calculated in step S51, and if the result of determination in step S52 is that the body movable section is within the movable limit, the body movable section is subjected to drive control at $\Delta \theta$ in step S53. Then, if the body movable section is within the movable limit (S55 Yes) the body movable section is subjected to drive control at $\Delta X^*Bx(Lx+Bx)$, $\Delta Y^*By(Ly+Bx)$ (S58).

On the other hand, if the body movable section is not within the movable limit (S55 No), the lens movable section is subjected to drive control at $\Delta X/n^*Lx/(Lx+Bx)$, $\Delta Y/n^*Ly/(Ly+By)$ (S60). Lx, Bx, Ly and By may be any numerical value between 0 and 1. Further, these values may be intentionally reduced uniformly. In a case where it is also desired to photograph together with something not on an astral body but on the ground, reducing performance of tracking is for the purpose of suppressing offset in something on the ground.

If drive control of the body movable section and lens movable section is performed in steps S58 and S60, then in step S61 and after the same processing as in the one embodiment is performed.

In this way, with the modified example of the flow for celestial body shooting, drive amounts $\Delta X$ and $\Delta Y$ are respectively normalized using X and Y direction coefficient for the lens and the body, namely BX and LX, and BY and LY, and so it is possible to perform tracking with good precision, without resolution being different at initial exposure and advanced exposure. Specifically, drive control for the body movable section and the lens movable section is performed in the X direction and the Y direction in accordance with resolution. If resolution is different for initial exposure and advanced exposure, drive amounts in the X direction and the Y direction will be different. With this modified example, since resolution is constant drive amount is constant from initial exposure to advanced exposure, and it is possible to perform tracking with food precision.

As has been described above, with the one embodiment and the modified example of the present invention, a tracking operation is performed, whereby, in a state where first and second image stabilization sections are held at initial positions, movement direction and movement velocity of a subject image that exists with an effective imaging region of an image sensor unit are calculated (refer, for example to S47, S49 and S51 in FIG. 10C), when at least one of the first and second image stabilization sections is driven, it is determined whether or not the subject image exists within the effective imaging region even if the subject is shifted in the movement direction and at the movement velocity that have been calculated (refer, for example to S55 in FIG. 10D), when it has been determined that the subject image can exist within the effective imaging region one of the first image stabilization section or the second image stabilization section is driven at the first movement velocity to shift the subject image in a first direction within the effective imaging region (refer, for example, to S57 in FIG. 10D), and when it has been determined that further shift is possible (refer, for example, to S56 in FIG. 10D), the other of the first image stabilization section or the second image stabilization section is driven at a second movement velocity to shift the subject image within the effective imaging region in a second direction (refer, for example to S59 in FIG. 10D). As a result, tracking is possible of a subject such as an astral body, over a long exposure time (observation time).

Also, with the one embodiment and modified example of the present invention, it is determined whether or not a subject image exists at a specified position within an effective imaging region for an image sensor unit, and movement direction and movement velocity for moving the subject image with respect to the image sensor unit are calculated (refer, for example, to S49 in FIG. 10C). Then, at least one of the first image stabilization section and the second image stabilization section is subjected to drive control based on the movement direction and movement velocity that have been calculated so that the subject image is always positioned at a specified position within the effective imaging region of the image sensor unit, to track the subject image (refer, for example, to S51 to S59 in FIG. 10C and FIG. 10D).

It should be noted that with the one embodiment and modified example of the present invention, tracking of a subject such as an astral body etc. is performed by the lens-side blur correction microcomputer 4 performing drive control of the lens side movable section (image stabilization lens 2a), and the body-side blur correction microcomputer 14 performing drive control of the body side movable section (image sensor 12). However, blur correction microcomputers that correct both movable sections have been provided within the lens barrel and the body, and perform drive control of the lens side and body side movable sections in a unified manner, and perform tracking of a subject such as an astral body. Further, movable sections for tracking have also served as movable sections for blur correction, but movable sections dedicated for tracking may also be provided.

Also, with the one embodiment and modified example of the present invention, description has been given of an example where an astral body such a star is tracked as a subject. However, the subject is not limited to an astral body such as a star, and the present invention can also be applied to a moving body such as an airplane that is navigating in the sky, for example. In the case of an astral body, tracking is possible as long as shooting site and height are known, but in the case of a moving body tracking may be performed by acquiring information such as movement direction of the moving body at an initial point Also, with the one embodiment and modified example of the present invention various peripheral circuits have been provided within the body-side blur correction microcomputer 14 and the body-side system controller 15. However, separately from these processors, processors for implementing functions of various peripheral circuits may also be provided. Also, the CPUs and peripheral circuits may also be constructed in the form of software using a CPU and programs, or may be constructed in hardware such as gate circuitry generated based on a programming language described using Verilog, or may be constituted using a DSP (digital signal processor). Suitable combinations of these approaches may also be used.

The use of a CPU is also not limiting as long as elements fulfill a function as a controller. Also, without being limited to CPUs, if there are elements that provide functions as a controller, the present inventions may be implemented by at least one processor that has been constructed as hardware. For example, functions implemented by CPUs may also be configured by a processor that is constructed as respective electronic circuits, and may also be each circuit section of a processor that has been constructed as an integrated circuit such as an FPGA (Field Programmable Gate Array). Alternatively, functions of each section may be executed by a processor that is constructed of at least one CPU reading out and executing computer programs that have been stored in a storage medium.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to adopt the present invention as long as a device tracks a subject such as an astral body.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A tracking device, comprising:
a photographing optical system having an image stabilization lens,
a first image stabilization actuator that causes the image stabilization lens to move translationally,
a second image stabilization actuator that causes an image sensor unit to move translationally and/or rotationally,
a plurality of sensors that acquire astral body position parameters including azimuth data and height data of an astral body as a tracking target, and latitude data of a photographing position, and
a processor that has a calculation section and a tracking control section, wherein
the calculation section calculates movement direction and movement velocity for moving an astral body image with respect to an image sensor based on a focal length of the photographing optical system and the astral body position parameters, and based on a result of the calculation, calculates an amount of translational movement of the photographing optical system by the first image stabilization actuator and an amount of translational movement and/or an amount of rotational movement of the image sensor unit by the second image stabilization actuator, and
the tracking control section controls the translational movement of the photographing optical system by the first image stabilization actuator and the translational movement and/or rotational movement of the image sensor unit by the second image stabilization actuator, based on the results of the calculations by the calculation section, such that the astral body image is positioned at a specified position within the effective imaging region of the image sensor.

2. The tracking device of claim 1, wherein:
the tracking control section drives one of the first image stabilization actuator or the second image stabilization actuator at a first movement velocity to shift the subject image in a first direction within the effective imaging region, and after that shift, it the determination section has determined that further shift is possible, drives the other of the first image stabilization actuator or the second image stabilization actuator at a second movement velocity to shift the subject image in a second direction within the effective imaging region.

3. The tracking device of claim 2, further comprising:
a first position detection sensor that detects position of the image stabilization lens that has been moved by the first image stabilization actuator; and
second position detection sensor that detects position of the image sensor that has been moved by the second image stabilization actuator;
wherein
the tracking control section,
performs drive control of an image stabilization actuator corresponding to either one of the first and second position detection sensors, based on output from one of the first position detection sensor and the second position detection sensor, until an image stabilization actuator corresponding to the one position detection sensor is shifted to a shift possible first target position, controls an image stabilization actuator corresponding to the other of the first and second position detection sensors, based on output from the other one of the first position detection sensor and the second position detection sensor, until an image stabilization actuator corresponding to the other position detection sensor is shifted to a shift possible second target position, and repeats until the first and second image stabilization actuators reach a moveable limit.

4. The tracking device of claim 2, wherein:
the first direction, first movement velocity, second direction and second movement velocity are capable of an allocation operation so that a moveable time from the movement amount and the movement velocity of the subject image becomes longest.

5. The tracking device of claim 2, wherein:
the tracking operation is repeated until immediately before the determination is rejected, or until a designated time is reached.

6. The tracking device of claim 1, wherein:
the tracking control section, when it has been determined, by the determination section, that the specified position of the subject image has become a maximum movement possible position on the effective imaging region of the image sensor, as a result of drive of only one of the first image stabilization actuator and the second image stabilization actuator, determines whether or not drive is possible using the other image stabilization actuator, and drives the other image stabilization actuator if the result of this determination is that drive is possible.

7. The tracking device of claim 1, wherein:
the tracking control section, when it is necessary to correct direction of the subject image by rotational drive of the image sensor to an appropriate position, rotates the subject image by initially driving the second image stabilization actuator, and then drives the image stabilization lens in a direction that is orthogonal to the optical axis of the image stabilization lens by driving one of the first image stabilization actuator and the second image stabilization actuator, and finally drives the image sensor in a direction that is orthogonal to the optical axis of the image stabilization lens by driving the other of the first image stabilization actuator and the second image stabilization actuator.

8. The tracking device of claim 1, wherein:
the processor further comprises a prediction section and an initial position calculation section, and wherein
the prediction section predicts direction and movement amount for moving the subject per unit time on the imaging region of the image sensor,
the initial position calculation section calculates initial position of the image stabilization lens and initial position of the image sensor to be able to track over the longest time within the effective imaging region of the image sensor, based on the prediction section, and
the tracking control section drives the first image stabilization actuator and the second image stabilization actuator based on output of the initial position calculation section to move the image stabilization lens and the image sensor to an initial position, and commences tracking by moving position of the subject image on the image sensor to an initial position at which the longest time drive is possible.

9. A tracking method, for a tracking device comprising a photographing optical system having an image stabilization lens, a first image stabilization actuator that causes the image stabilization lens to move translationally, and a second image stabilization actuator that causes an image sensor to move translationally and/or rotationally, comprising:

providing a plurality of sensors to acquire astral body position parameters including azimuth data and height data of an astral body as a tracking target, and latitude data of a photographing position;

calculating movement direction and movement velocity for moving the subject an astral body image with respect to the image sensor based on a focal length of the photographing optical system and the astral body position parameters, and based on a result of the calculation, calculating an amount of translational movement of the photographing optical system by the first image stabilization actuator and an amount of translational movement and/or an amount of rotational movement of the image sensor unit by the second image stabilization actuator; and controlling the translational movement of the photographing optical system by the first image stabilization actuator and the translational movement and/or rotational movement of the image sensor by the second image stabilization actuator, based on the results of the calculations, such that the astral body image is positioned at a specified position within an effective imaging region of the image sensor.

10. The tracking method of claim 9, further comprising:
driving one of the first image stabilization actuator or the second image stabilization actuator at a first movement velocity to shift the subject image in a first direction within the effective imaging region, and after that shift, if it has been determined that further shift is possible, driving the other of the first image stabilization actuator or the second image stabilization actuator at a second movement velocity to shift the subject image in a second direction within the effective imaging region.

11. The tracking method of claim 10, further comprising:
detecting position of the image stabilization lens that has been moved by the first image stabilization actuator, using a first position detection sensor;
detecting position of the image sensor that has been moved by the second image stabilization actuator using a second position detection sensor;
performing drive control of an image stabilization actuator corresponding to either one of the first and second position detection sensors, based on output from one of the first position detection sensor and the second position detection sensor, until an image stabilization actuator corresponding to the one position detection sensor is shifted to a shift possible first target position;
controlling an image stabilization actuator corresponding to the other of the first and second position detection sensors, based on output from the other one of the first position detection sensor and the second position detection sensor, until an image stabilization actuator corresponding to the other position detection sensor is shifted to a shift possible second target position; and
repeating until the first and second image stabilization actuators reach a moveable limit.

12. The tracking method of claim 10, wherein:
the first direction, first movement velocity, second direction and second movement velocity are capable of an allocation operation so that a moveable time from the movement amount and the movement velocity of the subject image becomes longest.

13. The tracking method of claim 10, wherein:
the tracking operation is repeated until immediately before the determination is rejected, or until a designated time is reached.

14. The tracking method of claim 9, further comprising:
when it has been determined that the specified position of the subject image has become a maximum movement possible position on the effective imaging region of the image sensor, as a result of drive of only one of the first image stabilization actuator and the second image stabilization actuator, determining whether or not drive is possible using the other image stabilization actuator, and driving the other image stabilization actuator if the result of this determination is that drive is possible.

15. The tracking method of claim 9, further comprising:
when it is necessary to correct direction of the subject image by rotational drive of the image sensor to an appropriate position, rotating the subject image by initially driving the second image stabilization actuator, and then driving the image stabilization lens in a direction that is orthogonal to the optical axis of the image stabilization lens by driving one of the first image stabilization actuator and the second image stabilization actuator, and finally driving the image sensor in a direction that is orthogonal to the optical axis of the image stabilization lens by driving the other of the first image stabilization actuator and the second image stabilization actuator.

16. The tracking method of claim 9, further comprising:
predicting direction and movement amount for moving the subject per unit time on the imaging region of the image sensor; and
calculating initial position of the image stabilization lens and initial position of the image sensor to be able to track over the longest time within the effective imaging region of the image sensor, based on the prediction section; and
driving the first image stabilization actuator and the second image stabilization actuator based on output of the initial position calculation section to move the image stabilization lens and the image sensor to an initial position, and commencing tracking by moving position of the subject image on the image sensor to an initial position at which the longest time drive is possible.

* * * * *